(12) United States Patent
Erpelding et al.

(10) Patent No.: US 9,792,948 B2
(45) Date of Patent: Oct. 17, 2017

(54) MECHANIZED TAKE-UP REEL AND METHOD FOR LOADING AND UNLOADING A TAPE STORAGE MEDIUM

(71) Applicant: International Business Machines Corporation, Armonk, NY (US)

(72) Inventors: A. David Erpelding, San Jose, CA (US); Wayne I. Imaino, San Jose, CA (US); Ronald R. Labby, San Jose, CA (US); Winfield S. Weaver, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 14/220,942

(22) Filed: Mar. 20, 2014

(65) Prior Publication Data

US 2015/0269963 A1 Sep. 24, 2015

(51) Int. Cl.
| | |
|---|---|
| G11B 15/67 | (2006.01) |
| G11B 23/037 | (2006.01) |
| G11B 23/107 | (2006.01) |
| G11B 15/32 | (2006.01) |

(52) U.S. Cl.
CPC ............ G11B 15/67 (2013.01); G11B 15/32 (2013.01); G11B 15/672 (2013.01); G11B 23/037 (2013.01); G11B 23/107 (2013.01)

(58) Field of Classification Search
CPC ..... G11B 15/67; G11B 15/672; G11B 23/107; G11B 15/32; G11B 23/037
See application file for complete search history.

(56) References Cited

U.S. PATENT DOCUMENTS

| | | | |
|---|---|---|---|
| 366,460 A | 5/1972 | Trefzger et al. | |
| 3,664,607 A | 5/1972 | Trefzger et al. | |
| 5,002,237 A | 3/1991 | Hirayama | |
| 6,079,651 A | 6/2000 | Hamming | |
| 6,082,652 A | 7/2000 | Theobald | |
| 6,227,475 B1 | 5/2001 | McAllister et al. | |
| 7,134,624 B2 | 11/2006 | Hamming | |
| 7,540,443 B2 * | 6/2009 | Nishimura | G11B 15/67 242/332.1 |
| 2003/0122013 A1 * | 7/2003 | Hiraguchi | G11B 15/67 242/332.8 |
| 2004/0129817 A1 * | 7/2004 | Hamming | G11B 15/67 242/332.8 |

(Continued)

OTHER PUBLICATIONS

Berman et al., U.S. Appl. No. 14/108,279, filed Dec. 16, 2013.
Erpelding et al. et al, U.S. Appl. No. 15/668,272, filed Aug. 3, 2017.

*Primary Examiner* — William A Rivera
(74) *Attorney, Agent, or Firm* — Zilka-Kotab, P.C.

(57) ABSTRACT

Various embodiments relate to apparatuses and methods for loading and unloading a tape storage medium. In one embodiment, an apparatus for such purpose includes a mechanized take-up reel. The mechanized take-up reel includes an inner hub, an outer hub being selectively non-rotatably coupleable with the inner hub (where at least one of the hubs is coupled to a rotating mechanism), a tongue coupled to the inner hub, and a slot in the outer hub for permitting the tongue to extend beyond a periphery of a tape engaging surface of the outer hub upon relative rotation between the inner and outer hubs.

25 Claims, 20 Drawing Sheets

(56) References Cited

U.S. PATENT DOCUMENTS

2010/0032513 A1\* 2/2010 Shimanuki ............. G11B 15/67
                                                      242/613
2015/0170708 A1\* 6/2015 Berman ............... G11B 23/037
                                                      242/337

\* cited by examiner

MECHANIZED TAKE-UP REEL AND METHOD FOR LOADING AND UNLOADING A TAPE STORAGE MEDIUM

BACKGROUND

The present invention relates to data storage systems, and more particularly, this invention relates to take-up reels for loading and unloading tape from tape reels.

In magnetic storage systems, data are read from, and written onto, a magnetic recording medium utilizing magnetic transducers. Data are written on the magnetic recording medium by moving a magnetic recording transducer to a position over the medium where the data are to be stored. The magnetic recording transducer then generates a magnetic field, which encodes the data into the magnetic medium. Data are read from the medium by similarly positioning the magnetic read transducer and then sensing the magnetic field of the magnetic medium. Read and write operations may be independently synchronized with the movement of the medium to ensure that the data can be read from, and written to, the desired location on the medium.

In the near future, with the adoption of improved media, the cost of storing information (on a per byte basis) on tape is expected to decline by a factor of five or more with respect to magnetic disk. Also, short-term and long-term reliability will continue to favor tape-based storage. Furthermore, as more mass storage is allocated to cloud networks, most storage will be in large libraries, rather than on individual drives, which is a consideration favoring tape-based storage.

BRIEF SUMMARY

In one embodiment, a method for loading a tape storage medium includes positioning a mechanized take-up reel with respect to a tape supply reel, positioning a feature coupled to a tape storage medium on the tape supply reel with respect to the mechanized take-up reel, rotatably decoupling an inner hub of the mechanized take-up reel from an outer hub of the mechanized take-up reel, extending a tongue of the mechanized take-up reel, engaging the tongue with the feature, retracting the tongue and feature into the outer hub, and nonrotably coupling the inner hub with the outer hub.

In another embodiment, a method for unloading a tape storage medium includes positioning a mechanized take-up reel with respect to a supply reel, rotatably decoupling an inner hub of the mechanized take-up reel from an outer hub of the mechanized take-up reel, extending a tongue coupled with the tape storage medium, and disengaging the tongue from the tape storage medium.

In yet another embodiment, an apparatus for loading and unloading a tape storage medium includes a mechanized take-up reel. The mechanized take-up reel includes an inner hub, an outer hub being selectively nonrotatably coupleable with the inner hub, wherein at least one of the hubs is coupled to a rotating mechanism, a tongue coupled to the inner hub, and a slot in the outer hub for permitting the tongue to extend beyond a periphery of a tape engaging surface of the outer hub upon relative rotation between the inner and outer hubs.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
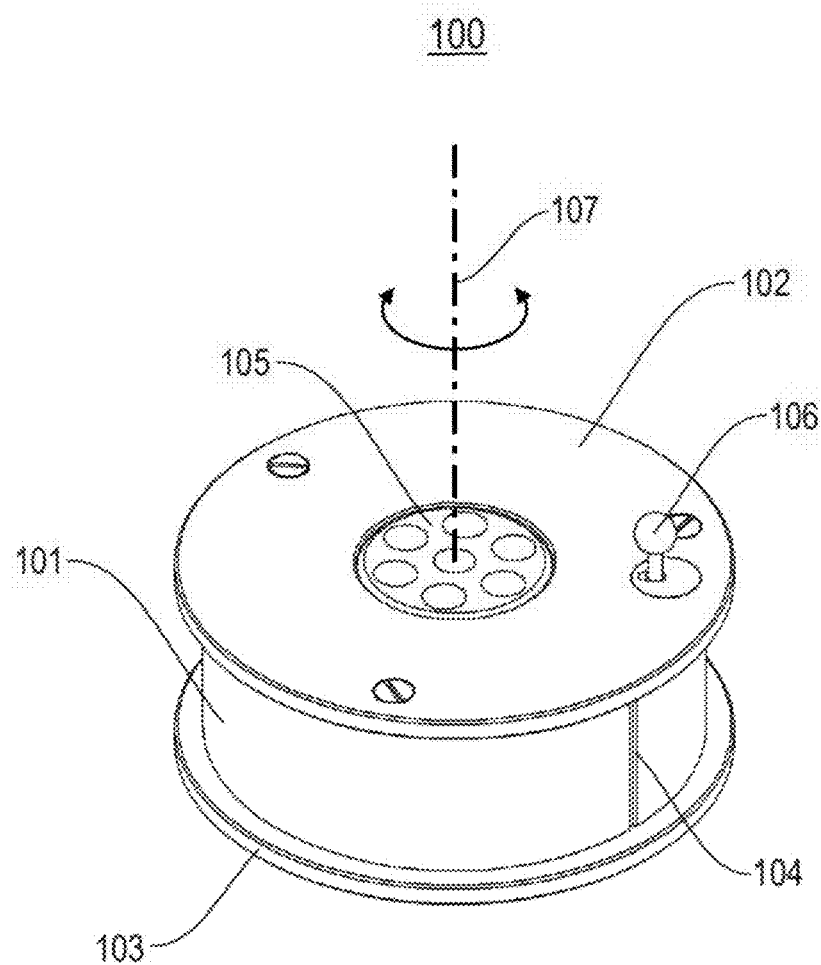
FIG. 1 is a perspective view of a mechanized take-up reel for loading and unloading a tape storage medium in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments described herein address the issue of fast loading and unloading of tape storage media to and from a supply reel. Although the size of the supply reel does not limit the various embodiments, the reduced size of the supply reel desirably enables faster loading and unloading of tape media than what is possible with conventional tape reel (cartridge) technology.

Accordingly, various embodiments described herein include mechanized take-up reels having functions and components connected therewith that enable rapid loading and unloading of a tape medium. As described above, speed is becoming more critical for tape storage to remain a viable technology for data storage and retrieval. It should be noted that, although different embodiments herein include mechanized take-up reels for loading and unloading tape medium in data storage systems, it is understood that the embodiments described herein are useful outside of a data storage system. Moreover, the utilization of the mechanized take-up reel for a tape medium loading and unloading in a data storage device is only one embodiment and is provided merely for purposes of brevity and clarity.

In one general embodiment, a method for loading a tape storage medium includes positioning a mechanized take-up reel with respect to a tape supply reel, positioning a feature coupled to a tape storage medium on the tape supply reel with respect to the mechanized take-up reel, rotatably decoupling an inner hub of the mechanized take-up reel from an outer hub of the mechanized take-up reel, extending a tongue of the mechanized take-up reel, engaging the tongue with the feature, retracting the tongue and feature into the outer hub, and nonrotably coupling the inner hub with the outer hub.

In another general embodiment, a method for unloading a tape storage medium includes positioning a mechanized take-up reel with respect to a supply reel, rotatably decoupling an inner hub of the mechanized take-up reel from an outer hub of the mechanized take-up reel, extending a tongue coupled with the tape storage medium, and disengaging the tongue from the tape storage medium.

In yet another general embodiment, an apparatus for loading and unloading a tape storage medium includes a mechanized take-up reel. The mechanized take-up reel includes an inner hub, an outer hub being selectively nonrotatably coupleable with the inner hub, wherein at least one of the hubs is coupled to a rotating mechanism, a tongue coupled to the inner hub, and a slot in the outer hub for permitting the tongue to extend beyond a periphery of a tape engaging surface of the outer hub upon relative rotation between the inner and outer hubs.

Figure 2:
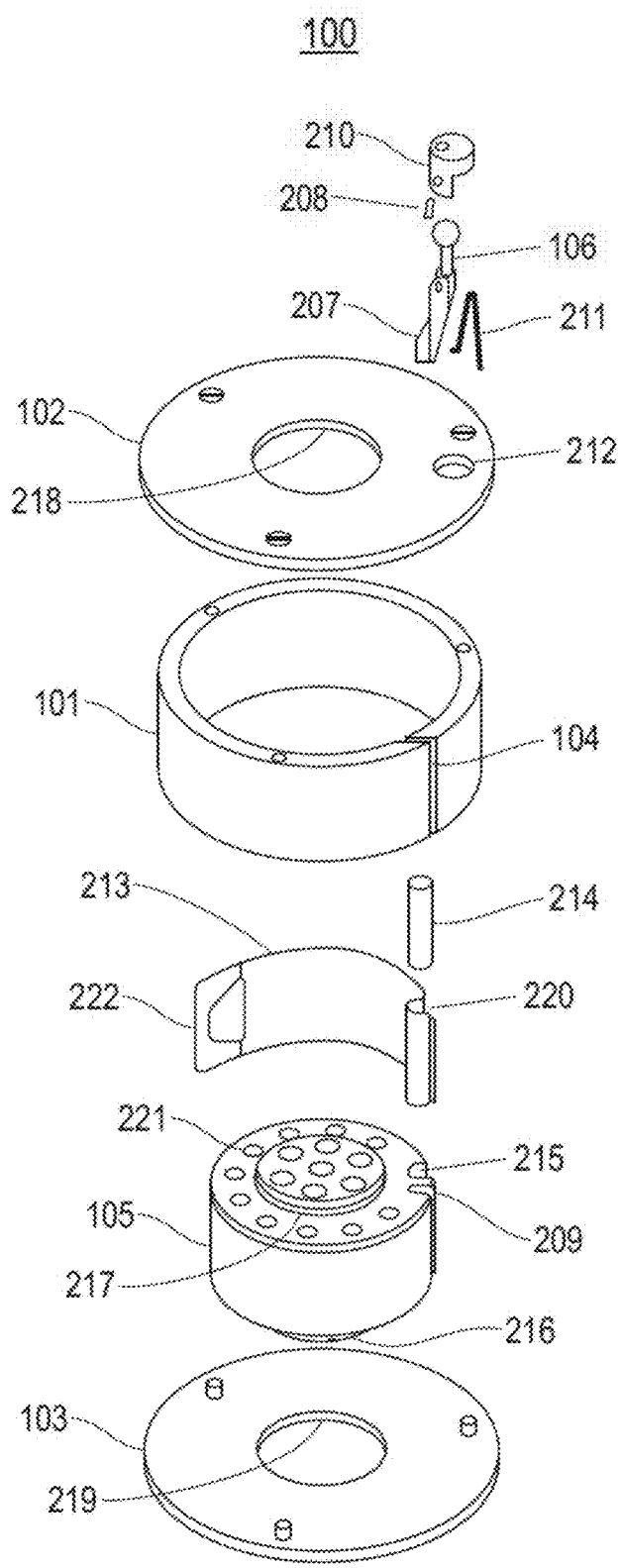
FIG. 2 is an exploded view of the mechanized take-up reel of FIG. 1.

With reference to FIGS. 1-2, a perspective view and exploded view, respectively, of a mechanized take-up reel 100 are shown in accordance with one embodiment. As an option, the present embodiment 100 may be implemented in conjunction with features from any other embodiment listed herein, such as those described with reference to the other Figures. Of course, however, such embodiment 100 and others presented herein may be used in various applications and/or in permutations which may or may not be specifically described in the illustrative embodiments listed herein. Further, the mechanized take-up reel 100 presented herein may be used in any desired environment.

The mechanized take-up reel 100 includes an inner hub 105 which may form a bearing surface, e.g., a journal bearing. The mechanized take-up reel 100 also includes an outer hub 101 which may be selectively nonrotatably coupleable with the inner hub 105, such that relative rotation between the inner and outer hubs is prevented when the inner and outer hubs are selectively nonrotatably coupled, and such relative rotation is permitted when the inner and outer hubs are not selectively nonrotatably coupled. Illustrative mechanisms for effecting the selectively nonrotatable coupling are presented in more detail below with reference to FIG. 2 and other figures.

One or both flanges 102, 103, may be coupled to respective ends of the outer hub 101, thereby forming an enclosing component. Moreover, in some approaches, the outer hub 101 may be an integrated hub/flange component.

According to an exemplary approach, at least one of the flanges 102, 103 may include a bearing for enabling rotation of the inner hub 105 with respect to the outer hub 101. It follows that in the present embodiment, at least one of the inner and outer hubs 105, 101 may be operatively coupled to a rotating mechanism, such as a motor. In one preferred approach, a motor is coupled to the inner hub 105 for rotating the inner hub relative to the outer hub 101. When the inner and outer hubs are nonrotatably coupled, the motor rotates both hubs together.

The mechanized take-up reel 100 further includes a tongue 213 coupled to the inner hub 105. Furthermore, the outer hub 101 includes a slot 104. As illustrated, the slot 104 includes two surfaces of outer hub 101 that may be substantially parallel to each other and extend from the inner diameter to the outer diameter of outer hub 101. Slot 104 is also preferably substantially perpendicular to flanges 102, 103.

The slot 104 permits the tongue 213 to extend beyond a periphery of a tape engaging surface of the outer hub 101 upon relative rotation between the inner and outer hubs 105, 101 in a first direction (counterclockwise in FIG. 1). Moreover, the tongue 213 may be retractable through the slot 104 upon relative rotation in a second direction opposite the first direction. Moreover, according to preferred approaches, the tongue 213 includes a distal end 222 for detachably coupling with a feature such as a clip that may be coupled to a tape storage medium, as will be described in detail below. It follows that the dimensions of the slot 104 are at least large enough to allow the tongue 213 and the feature coupled to the tongue (e.g., see FIG. 3E) to pass through the slot 104. However, the size of the slot may depend on other factors, such as the effect it will have on the curvature of the outer surface of the outer hub 101. According to an exemplary embodiment, a slot 104 having an opening that is about 0.04 inch measured in the direction perpendicular to the axis of rotation 107, results in an about 0.004 inch deviation in the curvature of the outer surface of the outer hub 101. As will be discussed in further detail below, the outer surface of the outer hub 101 is preferably almost entirely smooth, thereby allowing for an about constant linear speed and tension of a tape while wrapping/unwrapping the tape on the mechanized take-up reel 100.

According to a preferred approach, at least one surface of slot 104 is tangent to the inner diameter of outer hub 101. Moreover, flanges 102, 103 comprise flange inner diameters 218, 219 which preferably interact with bosses 216, 217 to form a journal bearing.

With continued reference to FIGS. 1-2, the relative rotation between the inner and outer hubs 105, 101 may be selectively enabled and disabled by a movable pawl 207. As illustrated, the pawl 207 may have a pivoted lever shaped, e.g., to move and engage with a recess in or coupled with a wheel, such as the inner hub 105. According to various approaches, the recess may include a notch, groove, hole, etc., or similar detent which prevents motion in a particular direction when engaged with the pawl.

Pawl engager 106 may interface with a de-coupler actuator. According to different approaches, the de-coupler actuator may be an external force and/or mechanism (e.g., see 507 of FIG. 5) for engaging the mechanized take-up reel 100.

Referring still to FIGS. 1-2, the flange 102 includes a pawl engager 106 that may pivot, thereby enabling movement, e.g., pivoting, rotation, etc. of the pawl 207 to selectively nonrotatably couple the inner hub with the outer hub. As a result, pawl 207 may selectively couple inner hub 105 with outer hub 101.

Pawl engager 106 is coupled with pawl 207, and pawl holder 210 is coupled with pawl 207 through pawl pivot 208. Pawl pivot 208 enables pawl engager 106 and pawl 207 to rotate within pawl holder 210. Pawl holder 210 is coupled with top flange 102 and extends through hole 212 and into the inner diameter of outer hub 101. Hole 212 has a perimeter that extends from two planar parallel surfaces of top flange 102. In accordance with various embodiments, the pawl holder 210 may be coupled to the top flange 102 using a press fit, a swage, a screw thread, a set screw, an adhesive, welding, etc., and/or any other approach known to one of ordinary skill in the art.

Spring 211 biases pawl 207 to rotate about pawl pivot 208, and engage pawl 207 at about the tapered groove 209, e.g., when tapered groove 209 is aligned with pawl 207. As illustrated, pawl 207 has a wedge shape to its walls, such that the pawl 207 may engage the angled walls of the tapered groove 209. The apex of the wedge shape of pawl 207 is preferably narrower than the opening of tapered groove 209 thereby enabling pawl 207 to enter the tapered groove 209 without contacting the opening of the tapered groove 209. Hence the pawl 207 may couple the inner hub 105 with the outer hub 101 and prevent relative rotation between inner hub 105 and outer hub 101.

When the inner hub 105 is coupled with the outer hub 101, a motor (e.g., see 802 of FIG. 8B) coupled to the inner hub 105 and/or outer hub 101 may rotate the inner hub 105, outer hub 101, and components of the mechanized take-up reel 100, e.g., as one unit. Thus, according to one approach, mechanized take-up reel 100 may be rotated around its axis of rotation 107 by a motor. It is to be understood that the disclosed configurations for rotating mechanized take-up reel 100 is in no way intended to limit the scope of the invention. For example, alternate embodiments may rotate the mechanized take-up reel 100 by using any suitable mechanism, such as a drive belt, rack and pinion, gear train, etc. Moreover, in some embodiments both the inner hub 105 and outer hub 101 may be independently rotatable, e.g., using two separate mechanisms, e.g., motors.

According to one approach, the combined mass of pawl engager 106 and pawl 207 may be such that their combined center of mass is located at the pawl engager 106. Thus, upon rotation of mechanized take-up reel 100, centrifugal force may push the combined center of mass of pawl engager 106 and pawl 207 away from the center of mechanized take-up reel 100. Hence during rotation of mechanized take-up reel 100, pawl 207 is preferably forced into tapered groove 209 by centrifugal force, thereby nonrotatably coupling the inner and outer hubs together.

As referred to herein, a tongue 213 preferably includes a strip of material that is attached at one end to a larger object and is free to move at its opposite end. Tongue 213 is coupled at one end to the inner hub 105, e.g., using a screw, a weld, a swage, an adhesive, a clamp, etc., and/or any other conventional coupling device known to one of ordinary skill in the art of joining technology. As presented in FIG. 2, according to one approach, a coupling pin 214 may be inserted into both hem 220 and round groove 215. Hem 220 fits within round groove 215 and is captured by coupling pin 214, thereby inhibiting decoupling of tongue 213 from inner hub 105 during relative rotation between the inner hub 105 and the outer hub 101.

Figure 3A:
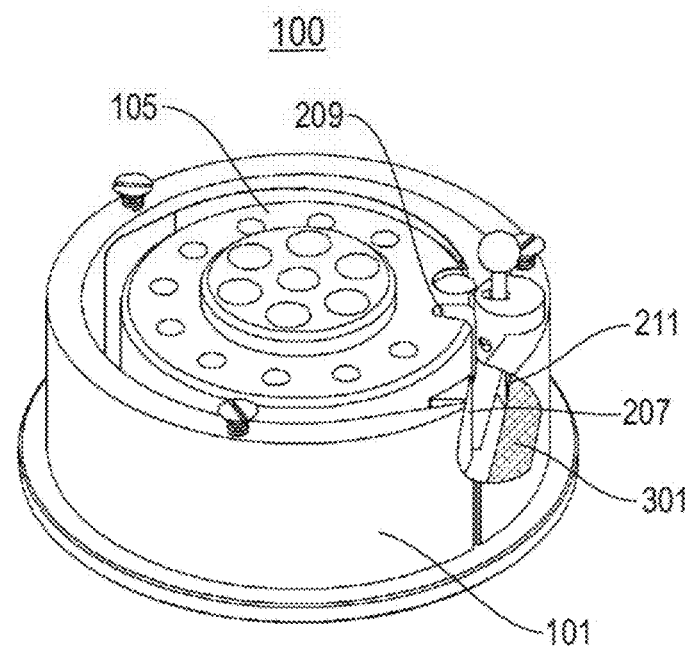
FIGS. 3A-3D are perspective views of a mechanized take-up reel for loading and unloading the tape storage medium in accordance with one embodiment.
Figure 3B:
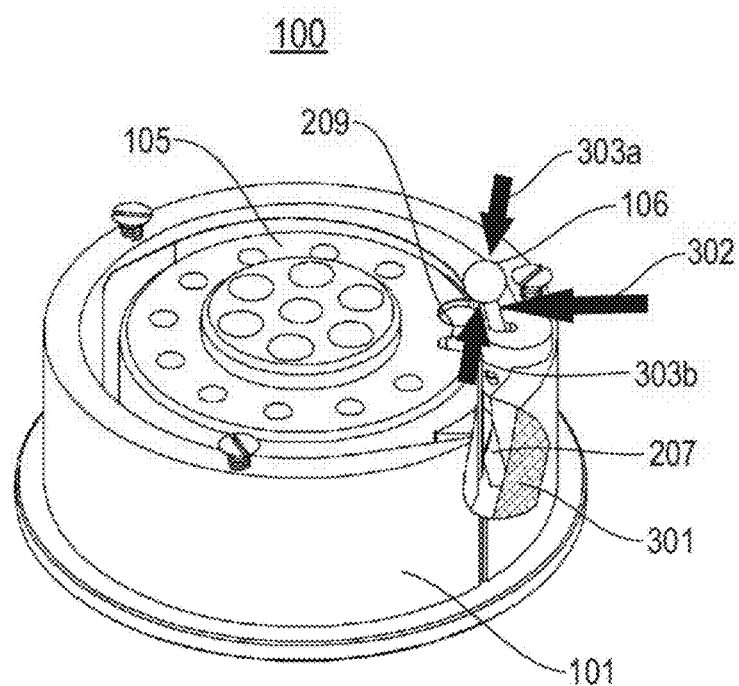
Figure 3C:
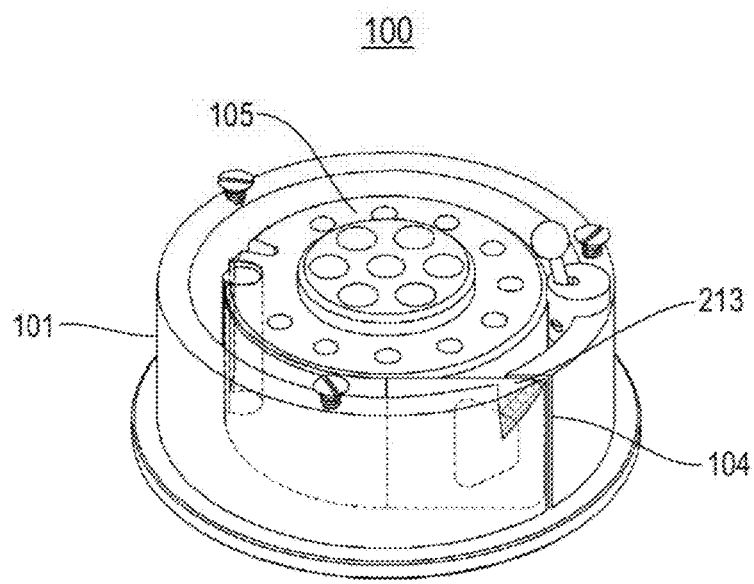
Figure 3D:
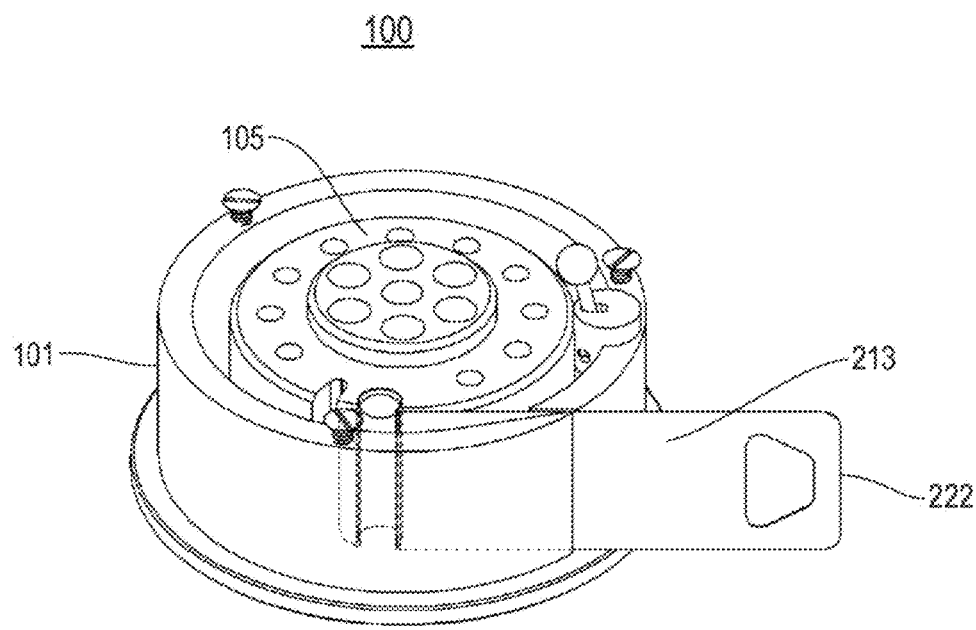

Relative rotation between the inner hub 105 and the outer hub 101 preferably enables tongue 213 to extend and retract through slot 104 (e.g., see FIGS. 3C-3D). According to preferred approaches, the tongue 213 may be fabricated from a resiliently deformable material, e.g., that imparts spring-like characteristics to the tongue 213. Illustrative resiliently deformable materials may include, but are not limited to, precipitation hardened stainless steel, work hardened stainless steel, hardened beryllium copper, plastic, etc., and/or any other spring-like material known to one of ordinary skill in the art of material science. Thus, according to preferred approaches, tongue 213 returns to its typically flattened form upon being released from a deflected state. Resiliently deformable materials may also be stiff in the plane of tongue 213 and may fiuther inhibit buckling of tongue 213 when inner hub 105 is rotated and pushes tongue 213 into contact with the inner diameter of outer hub 101. Thus, the distal end 222 of the tongue 213 may have a generally flattened shape.

According to one approach, the thickness of tongue 213 may be uniform, thus allowing smooth passage of the distal end of tongue 213 through slot 104 as it is pushed beyond the perimeter of outer hub 101 by the rotation of inner hub 105. However, in other approaches, the thickness of tongue 213 may be tapered, e.g., from one of its ends towards the other. Preferably the tongue 213 is designed such that rotation of the inner hub 105 will retract tongue 213 through slot 104 and within the inner diameter of outer hub 101.

In accordance with one embodiment, the inner hub 105 may include one or more lightening holes 221. A lightening hole 221 may include a hollow place in inner hub 105 that is bounded by at least one surface of inner hub 105. According to one approach, the lightening hole 221 may be formed by removing materials from inner hub 105, e.g., by drilling, machining, etc., thereby reducing the mass and/or inertia of the inner hub 105. This may enable the inner hub 105 to rotate faster with a constant amount of torque from a motor. Moreover, depending on the desired embodiment, the lightening hole(s) 221 may be positioned and/or sized so as to optimize the balance of inner hub 105.

Mechanized take-up reel 100 is preferably coupled with a motor (e.g., see 802 of FIG. 8B), e.g., using a press fit, a swage, a screw thread, a set screw, an adhesive, welding, a clamp, a spindle, etc., and/or any other method or device known to one of ordinary skill in the art of joining technology. Moreover, coupling mechanized take-up reel 100 with said motor may be accomplished using features in one or both bosses 216, 217 if they are appropriate for the respective coupling method.

FIGS. 3A-3D illustrate perspective views and cut-away details of a mechanized take-up reel 100 according to one embodiment. As an option, the present mechanized take-up reel 100 may be implemented in conjunction with features from any other embodiment listed herein, such as those described with reference to the other Figures, such as FIGS. 1-2. Accordingly, various components of FIGS. 3A-3D have common numbering with those of FIGS. 1-2.

Of course, however, such mechanized take-up reel 100 and others presented herein may be used in various applications and/or in permutations which may or may not be specifically described in the illustrative embodiments listed herein. Further, the mechanized take-up reel 100 presented herein may be used in any desired environment.

For clarification of mechanized take-up reel 100 in FIGS. 3A-3B, top flange 102 has been removed. Presented in FIG. 3A, pawl 207 engaging with tapered groove 209 is visible through break-out 301. Presented in FIG. 3B, pawl 207 disengaging from tapered groove 209 is visible through break-out 301 as disengaging force 302 pushes on pawl engager 106, e.g., by a de-coupler actuator (not shown). In accordance with one embodiment, pawl engager 106 may receive disengaging force 302.

According to one embodiment, the pawl engager 106 may be able to couple with opposing tangential forces 303a and 303b or barriers. In one approach, opposing tangential forces 303a, 303b may be applied to pawl engager 106 by a de-coupler actuator (not shown) external to mechanized take-up reel 100. With pawl 207 disengaged from tapered groove 209, inner hub 105 may be rotated independently from outer hub 101. Thus, opposing tangential forces 303a, 303b or barriers may prevent outer hub 101 from rotating substantially with respect to inner hub 105.

The pawl 207 may engage the inner hub 105 by coupling with tapered groove 209, which is positioned in an outer perimeter of inner hub 105. It follows that, according to some embodiments, the inner and outer hubs 105, 101 may be nonrotatably coupled when in a predefined alignment relative to each other, and in some embodiments, may be nonrotatably coupled only when in a predefined alignment relative to each other. In other words, the inner and outer hubs 105, 101 may be nonrotatably coupled when in a predefined alignment such that the pawl 207 is aligned with the tapered groove 209 and received thereby.

Furthermore, it is to be understood that the location of the tapered groove 209 and a pawl 207 as presented in FIGS. 3A-3D is in no way intended to limit the scope of any of the embodiments described herein. Thus, alternate embodiments may position the tapered groove and/or pawl in different locations other than those presented in FIGS. 3A-3D.

Referring to FIGS. 3C-3D, the portion of tongue 213 that is hidden behind outer hub 101 is shown as dashed lines for clarification. According to the embodiment illustrated, coupling and decoupling of outer hub 101 with inner hub 105 is enabled by engagement and disengagement of pawl 207 with tapered groove 209. The tongue 213 is coupled with inner hub 105 and is enabled to pass through slot 104 in outer hub 101 by the rotation of inner hub 105 with respect to outer hub 101.

When the inner and outer hubs 105, 101 are free to rotate relative to each other, the tongue 213 may be retracted or extended through the slot 104 as described above. Depending on the desired embodiment, the tongue 213 may be retracted such that the end of the tongue 213 resides in the slot 104 when fully retracted, e.g., as shown in FIG. 3C. However, in other approaches, the tongue 213 may be wrapped around the inner hub such that the tongue 213 is completely retracted from the slot when in a retracted position. For example, the tongue may be retracted so that it no longer engages the slot (e.g., see FIGS. 3A-3B). The relative locations of the pawl 207 and tapered groove 209 may be predefined to select the final location of the distal end 222 of the tongue 213.

Figure 3E:
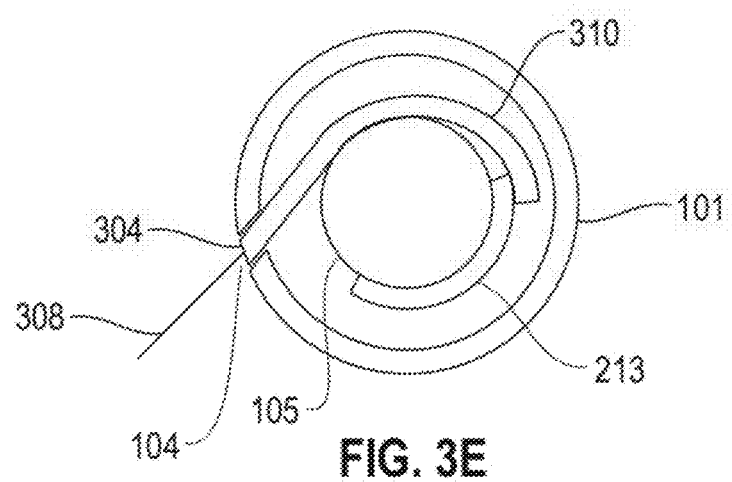
FIG. 3E is a top-down view of a mechanized take-up reel in accordance with one embodiment.
Figure 3F:
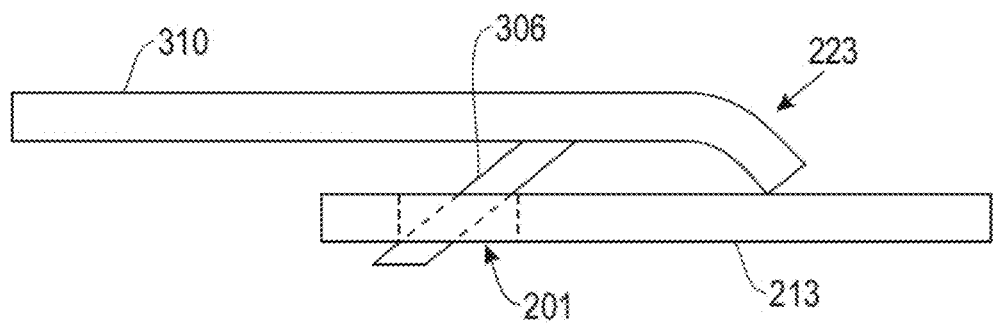
FIG. 3F is a representational in use diagram, in accordance with one embodiment.

According to an exemplary embodiment, which is in no way intended to limit the invention, FIG. 3F illustrates an in-use diagram of coupling the tongue 213 with a feature 310, e.g., clip, leader, etc. In the embodiment shown, the feature is a clip 310, e.g., as described in U.S. patent application Ser. No. 14/108,279 to Berman et al., filed Dec. 16, 2013 with title "SPRING CLIP LEADER AND HOUSING FOR MAGNETIC TAPE", which is herein incorporated by reference. As shown, the tongue 213 includes a link slot 201 which selectively detachably engages the engagement feature 306, e.g., a barb positioned towards a leading end of the clip 310, thereby effecting the coupling. According to one approach, the link slot 201 of the tongue 213 may extend all the way through the tongue 213, as illustrated in the present embodiment. However, according to other approaches, the link slot 201 may extend only partially through the tongue 213, e.g., similar to a notch in which the tongue 213 may be fixed when under tension.

Furthermore, it should be noted that the bent portion 223 of the clip 310 is illustrated as preventing the tongue 213 from becoming wedged between the body of the clip 310 and the engagement feature 306. This may desirably prevent the tongue 213 from becoming unable to disengage the engagement feature 306, thereby preserving the functionality of the system in which the tongue 213 and/or engagement feature 306 are located.

In various embodiments, the feature 306 and/or the clip 310 may include different designs, including any of those described herein and/or in U.S. patent application Ser. No. 14/108,279, which has been incorporated by reference. Moreover, according to various embodiments, any of the approaches described herein may be implemented in and/or in combination with any of the tape drives described in U.S. patent application Ser. No. 14/108,279, which has been incorporated by reference.

Looking now to FIG. 3E, according to another embodiment, the inner and outer hubs 105, 101 may be nonrotatably coupled when a distal edge 304 of the feature 310 coupled to a tape storage medium 308 resides in the slot 104 of the outer hub 101 when the tongue 213 is fully retracted to a use position. For example, using relative rotation between the inner and outer hubs 105, 101, the tongue 213 and feature 310 coupled thereto may be retracted to a point where the distal edge 304 of the feature 310 resides in the slot 104. Thus, according to various approaches, the number of degrees that the inner and outer hubs 105, 101 rotate relative to each other between retracted and extended positions may depend on the dimensions of: the tongue 213, the inner and outer hubs 105, 101, and/or the feature 310.

With continued reference to FIG. 3E, the tongue 213 and feature 310 may be extended by producing relative rotation between the inner and outer hubs 105, 101, e.g., to position the tongue 213 in an extended position. This desirably enables the tongue 213 and feature 310 to be extended from the retracted position without relying on a tension applied to the tape storage medium 308 to effectively pull the tongue 213 and feature 310 from a retracted position. As a result, by having a distal edge 304 of a feature 310 reside in the slot 104 when in a retracted position, damage to the tape storage medium 308 is prevented during transition to the extended position, while maintaining reliable functionality of the mechanized take-up reel 100.

Moreover, the dimensions of the hubs 105, 101 and/or tongue 213, as well as the location of a mechanism (e.g., pawl 207) for effecting the nonrotatable coupling, may enable the distal edge 304 of the feature 310 to reside in the slot 104. This desirably provides for a smooth outer surface of the outer hub 101 as the feature 310 and tongue 213 are stored within a periphery of the outer hub 101. Moreover, the slot is preferably designed so as to reduce the effect it has on the curvature of the outer surface of the outer hub 101. As a result, the outer surface of the outer hub 101 is almost entirely smooth (e.g., without protrusions) which allows for an about constant linear speed the tape and tension while wrapping/unwrapping the tape storage medium 308 about the outer hub 101. This design overcomes potential problems that may be encountered in embodiments with protrusions on the outer surface of the outer hub, such as formation of a perturbation as the tape is wrapped thereover, undesirably resulting in uneven wind speeds, varying tape tensions, stress points, and errors.

As noted above, other mechanisms may be employed for creating the nonrotatable coupling between the inner and outer hubs. For example, looking to FIG. 3G, the inner and outer hubs 105, 101 may be nonrotatably coupled when a bearing 320 (e.g., a ball bearing) engages a recess 322 in and/or coupled with a shaft 324. The shaft is nonrotatably coupled to the outer hub 101. The inner hub 105 is rotatable by a rotation mechanism such as a motor.

As shown, the bearing 320 resides in a slot in the inner hub 105, moving with the inner hub relative to the outer hub 101. When the bearing 320 engages the recess 322 of the shaft 324, e.g., upon the tongue 213 and/or the feature 310 pushing the bearing 320 into the recess 322 when the tongue 213 is retracted, the bearing 320 nonrotatably couples the inner hub 105 to the shaft. Because the shaft 324 is statically attached to the outer hub, by engaging the recess 322 of the shaft 324, the bearing 320 effectively restricts relative motion between the inner and outer hubs 105, 101. Therefore, according to the present embodiment, the inner and outer hubs 105, 101 are nonrotatably coupled together when the bearing 320 engages the recess 322 of the shaft 324.

As illustrated, the bearing 320 may engage the recess 322 of the shaft 324 when the tongue 213 and/or feature 310 are retracted, e.g., preferably such that the inner and outer hubs 105, 101 are in a predefined alignment. According to one approach, the bearing 320 may engage the recess 322 as a result of the tension produced by wrapping the tongue 213 and/or the feature 310 around the outer surface of the inner hub 105 and/or the tension produced by wrapping the tape 308 around the outer surface of the outer hub 101.

Figure 3G:
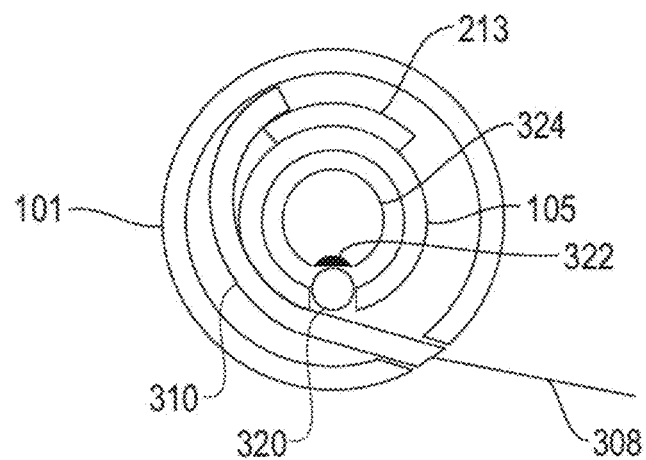
FIG. 3G is a top-down view of a mechanized take-up reel in accordance with one embodiment.

Referring still to FIG. 3G, the bearing 320 may disengage the recess 322 when the tongue 213 and/or feature 310 are extended, thereby allowing relative motion between the inner and outer hubs 105, 101. A spring, centrifugal force, etc. may assist in moving the bearing 320 from the recess 322.

Figure 4A:
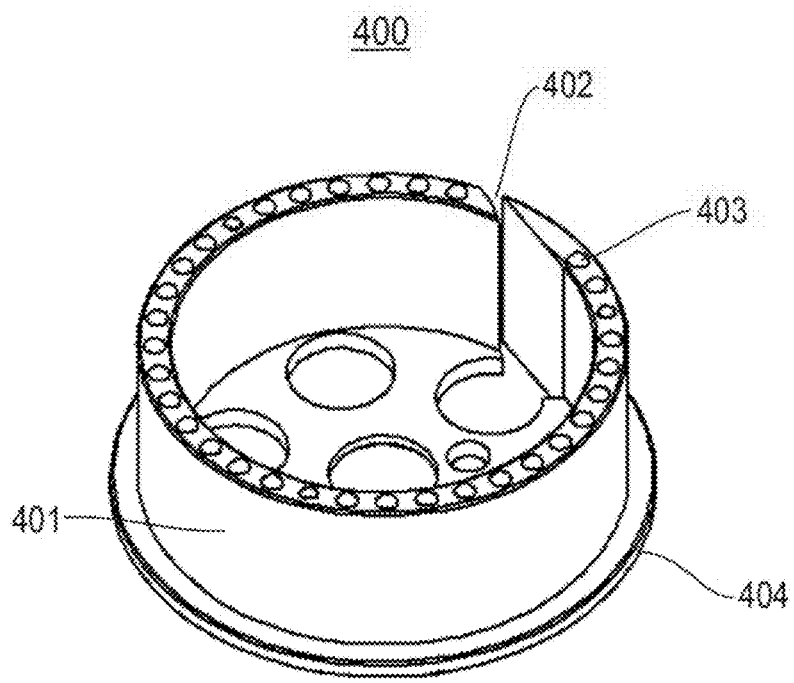
FIGS. 4A-4B are perspective views of components for a mechanized take-up reel for loading and unloading the tape storage medium in accordance with one embodiment.
Figure 4B:
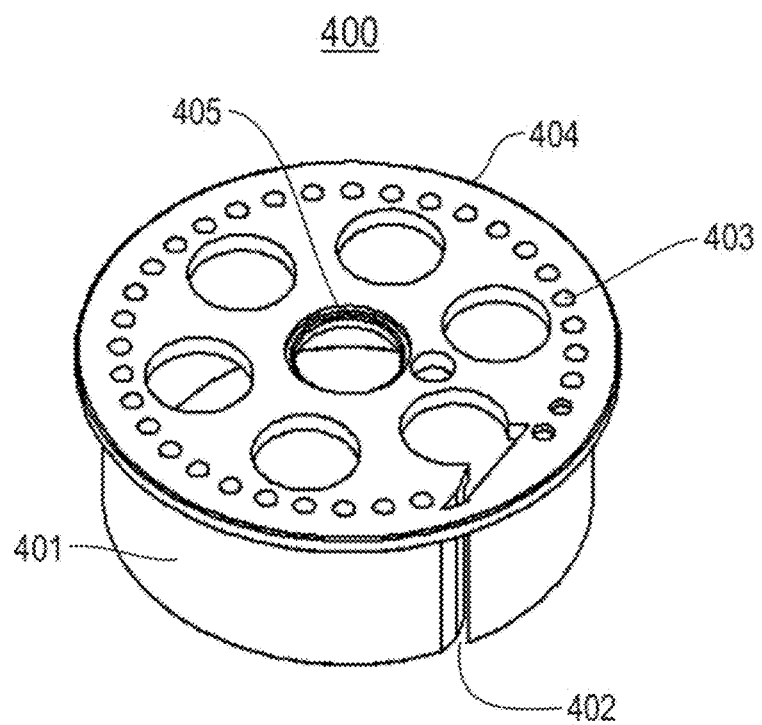

FIG. 4A-4B are perspective views of a hub/flange 400 for a mechanized take-up reel according to any of the embodiments described herein, for loading and unloading the tape storage medium in accordance with another embodiment. As an option, the present hub/flange 400 may be implemented in conjunction with features from any other embodiment listed herein, such as those described with reference to the other Figures. Of course, however, such hub/flange 400 and others presented herein may be used in various applications and/or in permutations which may or may not be specifically described in the illustrative embodiments listed herein. Further, the hub/flange 400 presented herein may be used in any desired environment.

Hub/flange 400 is preferably a single component that combines the functions of outer hub 101 and flanges 102, 103. According to one embodiment, the hub/flange 400 comprises hub section 401, flange section 404, optionally at least one lightening hole 403, slot 402, and bearing receptacle 405. Slot 402 has two surfaces of hub section 401 that are parallel to each other, extend from the inner diameter to the outer diameter of hub section 401, and are perpendicular to flange section 404.

The slot 402 also provides a transition to a hole in flange section 404, thereby providing a continuous circular perimeter for flange section 404. It is desirable to have a continuous circular perimeter for flange section 404 so that hub/flange 400 maintains structural rigidity. Alternatively, a perimeter with a discontinuity in line with slot 402 would cause hub/flange 400 to be weak at the discontinuity, but may be implemented in some embodiments.

An additional advantage to having hub section 401 and flange section 404 combined into a single hub/flange 400 is not having two pieces to assemble. Furthermore, inertial balance is more easily achieved. Good inertial balance enables vibration reduction of a drive mechanism, such as a motor that rotates a mechanized take-up reel. Vibration reduction enables improved bearing life for bearings in a mechanized take-up reel as well as bearings in a drive mechanism.

With continued reference to FIGS. 4A-4B, the hub/flange 400 further includes one or more lightening holes 403. As illustrated, each lightening hole 403 may be a hollow place in the hub/flange 400 and is bounded by at least one surface of hub/flange 400. In other approaches, the lightening hole 403 may be filled with a relatively lighter material than the material of the hub/flange. Moreover, the lightening hole 403 desirably reduces the mass and/or inertia of the inner hub 105. This may enable the hub/flange 400 to rotate faster with a constant amount of torque from a motor. Moreover, depending on the desired embodiment, the lightening hole 403 may be positioned and/or sized so as to optimize the inertial balance of hub/flange 400. Inertial balance reduces vibration when hub/flange 400 is rotated with a drive mechanism, such as a motor that rotates a mechanized take-up reel. Vibration reduction of a mechanized take-up reel for a tape medium loading and unloading in a data storage device minimizes vibration transmitted into the tape media, which may otherwise cause errors while writing and/or reading data.

In accordance with one embodiment, the hub/flange 400 includes bearing receptacle 405. In one approach, the bearing receptacle 405 may include a hollow place in hub/flange 400, bounded by at least one surface of hub/flange 400. Moreover, the bearing receptacle 405 may be located at the center of hub/flange 400. The perimeter wall of bearing receptacle 405 may also be able to couple with a ball bearing.

Figure 5:
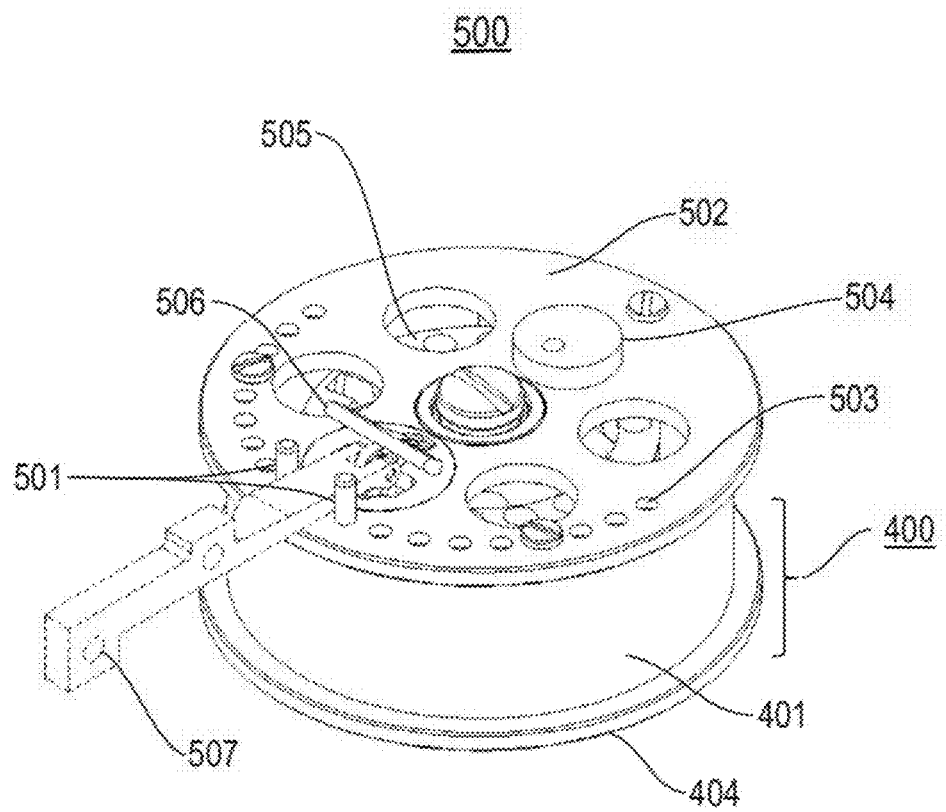
FIG. 5 is a perspective view of a mechanized take-up reel for loading and unloading a tape storage medium in accordance with one embodiment.

With reference to FIG. 5, a perspective view of mechanized take-up reel 500 is shown in accordance with another embodiment. As an option, the present mechanized take-up reel 500 may be implemented in conjunction with features from any other embodiment listed herein, such as those described with reference to the other Figures. Of course, however, such mechanized take-up reel 500 and others presented herein may be used in various applications and/or in permutations which may or may not be specifically described in the illustrative embodiments listed herein. Further, the mechanized take-up reel 500 presented herein may be used in any desired environment.

Referring now to FIG. 5, the mechanized take-up reel 500 includes a hub/flange 400, a clocking stop 501, a flange 502, lightening holes 503, a counter weight 504, an inner hub 505, and a pawl 506. Hub/flange 400 is coupled with flange 502. According to different approaches, accurate alignment of flange 502 with hub/flange 400 may be accomplished using a channel in flange 502 that mates with hub section 401, pins that intersect hub section 401, fasteners such as flat head screws that couple flange 502 to hub/flange 400, etc., or using other methods which would be apparent to one skilled in the art upon reading the present description. Thus, the current embodiment is in no way intended to be limited to the features shown.

Accurate alignment of a flange to a hub is desirable to achieve inertial balance which enables vibration reduction when rotated with a drive mechanism, such as a motor, that rotates a mechanized take-up reel. Moreover, vibration reduction of a mechanized take-up reel for a tape medium loading and unloading in a data storage device minimizes vibration transmitted into the tape media that may otherwise cause errors while writing and/or reading data.

In various embodiments, the lightening hole 503 may include any of the approaches described above with reference to lightening holes 403 of FIGS. 4A-4B.

With continued reference to FIG. 5, the counter weight 504 may be coupled with flange 502. Counter weight 504 preferably enables balancing the mass of mechanized take-up reel 500 and hence the inertial balance of mechanized take-up reel 500, thereby reducing vibration of mechanized take-up reel 500. Inertial balance enables vibration reduction of mechanized take-up reel 500 when it is rotated with a drive mechanism, such as a motor. As described above, vibration reduction of a mechanized take-up reel for a tape medium loading and unloading in a data storage device desirably minimizes vibration transmitted into the tape media.

The mechanized take-up reel 500 also includes a clocking stop 501. According to the present embodiment, the clocking stop 501 is able to interact with a mechanism 507 that is separate from mechanized take-up reel 500. The interaction of the mechanism 507 and clocking stop 501 preferably limits the rotation of hub/flange 400 to an angular rotation position predetermined by the positioning device. Thus, according to preferred approaches, the mechanism 507 acts as a positioning device for preventing rotation of the (outer) hub/flange 400 at a particular angular rotation, while the inner hub 505 may be free to rotate.

With continued reference to FIG. 5, the mechanism 507 may additionally and/or alternatively act as a de-coupler actuator, e.g., for engaging the pawl 506 to enable and/or disable the nonrotatable coupling between the hubs 505, 400.

Figure 6:
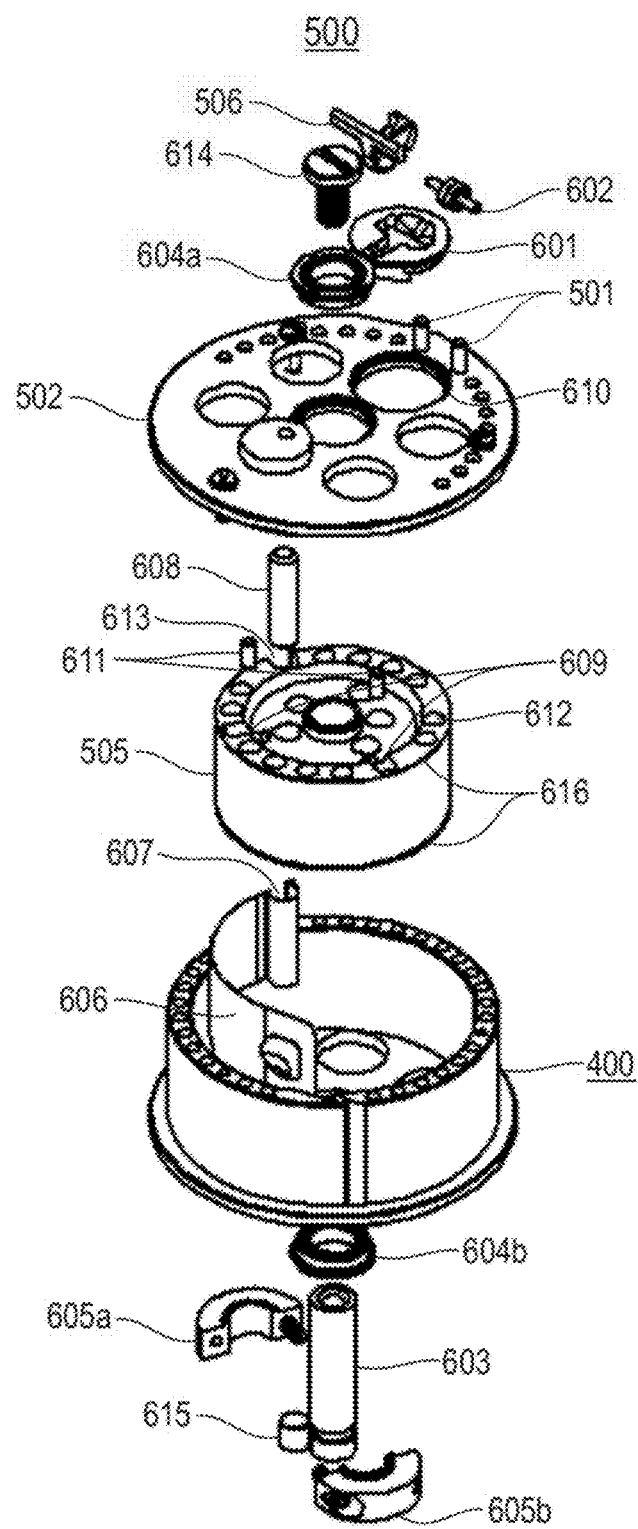
FIG. 6 is a perspective exploded view of the mechanized take-up reel of FIG. 5.

For clarification of the components of mechanized take-up reel 500 and their relationship to each other, FIG. 6 shows a perspective exploded view of mechanized take-up reel 500 previously presented in FIG. 5. Pawl 506 is coupled with pawl pivot bearing 602. Pawl holder 601 is coupled with pawl 506 through pawl pivot bearing 602. Pawl pivot bearing 602 enables pawl 506 to rotate within pawl holder 601. Pawl holder 601 is coupled with flange 502 and extends through hole 610 and into the inner diameter of hub/flange 400.

Furthermore, the hole 610 has a perimeter that extends from two planar parallel surfaces of flange 502. According to different embodiments, the pawl holder 601 may be coupled to the flange 502 using a press fit, a swage, a screw thread, a set screw, an adhesive, welding, etc., and/or any other method or device that would be apparent to one of ordinary skill in the art of joining technology upon reading the present disclosure.

Inner hub 505 comprises tapered groove 609 in and/or coupled with the inner hub 505. As described above, the pawl 506 has a wedged shape to its walls, such that the pawl 506 may be able to mesh with tapered groove 609. Thus, when tapered groove 609 is aligned with pawl 506, the pawl 506 is preferably able to engage with tapered groove 609. The wedge shape of pawl 506 may also enable the pawl 506 to make intimate contact with tapered groove 609. The wedge shape of pawl 506 is preferably narrower than the opening of tapered groove 609 thereby enabling the pawl 506 to enter into tapered groove 609 without contacting the opening thereof. Hence pawl 506 may nonrotatably couple the inner hub 505 with hub/flange 400 and prevent relative rotation between inner hub 505 and hub/flange 400. With inner hub 505 nonrotatably coupled with hub/flange 400, a motor (not shown) coupled with inner hub 505 enables mechanized take-up reel 500 to rotate with all its components as one unit.

In one embodiment, the mass of pawl 506 may be such that the center of mass of the pawl 506 is on the opposite side of pawl pivot bearing 602 from the tapered groove 609. However, upon rotation of mechanized take-up reel 500 centrifugal force pushes the center of mass of pawl 506 away from the center of mechanized take-up reel 500. Hence during rotation of mechanized take-up reel 500, pawl 506 may be forced towards the tapered groove 609 by centrifugal force.

According to a further approach, before mechanized take-up reel 500 is rotated and pawl 506 is forced towards the tapered groove 609 by centrifugal force, magnet 611 may hold pawl 506 in tapered groove 609. For clarification, FIG. 6 shows magnet 611 outside of tapered groove 609, yet it should be noted that in an assembled mechanized take-up reel as shown in FIG. 5, the magnet 611 is preferably coupled with the tapered groove 609 opposite the opening of tapered groove 609.

In another embodiment, inner hub 505 may include more than one tapered groove 609, which may enable nonrotatably coupling the inner hub 505 and the hub/flange 400 in more than one predefined alignment. Nonrotatably coupling the inner hub 505 to the hub/flange 400 in more than one predefined alignment is useful for locking tongue 606 in an extended position from hub/flange 400. According to another approach, it may be useful to be able to nonrotatably couple the inner hub 505 and the hub/flange 400 while the tongue 606 is in a retracted position form hub/flange 400.

According to various approaches, the tongue 606 may be coupled at one end with inner hub 505 using a screw, a weld, a swage, an adhesive, a clamp, etc., and/or any other method or device known to one of ordinary skill in the art of joining technology. As presented in FIG. 6, the tongue 606 is coupled at one end with inner hub 505 using coupling pin 608 inserted into both hem 607 and round groove 613. Hem 607 fits within round groove 613 and is captured by coupling pin 608, thus inhibiting decoupling of tongue 606 from inner hub 505 during rotation of inner hub 505.

The inner hub 505 also includes a ridge 616. Ridge 616 is preferably able to couple with tongue 606 and maintain position of tongue 606 with respect to inner hub 505. Moreover, lightening holes 612 may include any of the approaches described above with reference to lightening holes 403 of FIGS. 4A-4B.

With continued reference to FIG. 6, inner hub 505 is coupled with shaft 603. Shaft 603 is coupled with bearings 604a, 604b. Furthermore, mechanized take-up reel 500 may be coupled with a motor (e.g., see 802 of FIG. 8B) using a coupling clamp 605a, 605b and/or shaft 603. In a preferred approach, the shaft 603 includes a flexible end adjacent to clamp 605a, 605b; an inner diameter bore, e.g., for receiving a drive shaft from the motor; and a threaded end to receive preload screw 614. Clamp 605a, 605b may be used to tighten around shaft 603 and the shaft of a drive motor, thereby preferably coupling the two. Alternatively, mechanized take-up reel 500 may be coupled with a motor using a press fit, a swage, a screw thread, a set screw, an adhesive, welding, a clamp, etc., and/or any other method or device known to one of ordinary skill in the art of joining technology.

Shaft 603 is further coupled to components of mechanized take-up reel 500 with preload screw 614. As preload screw 614 is tightened to threaded end of shaft 603, clamp 605a, 605b is pulled against the inner race of bearing 604b, and preload screw 614 is pulled against the inner race of bearing 604a, thereby preloading bearing 604a, 604b.

According to one approach, crash pin 615 is coupled with hub/flange 400 and protrudes within the boundary of inner hub 505. Imer hub 505 further includes a crash stop (not shown) that will interfere with the rotation of inner hub 505 by impinging upon crash pin 615 when a predetermined relative rotation between inner hub 505 and hub/flange 400 is exceeded.

Figure 7A:
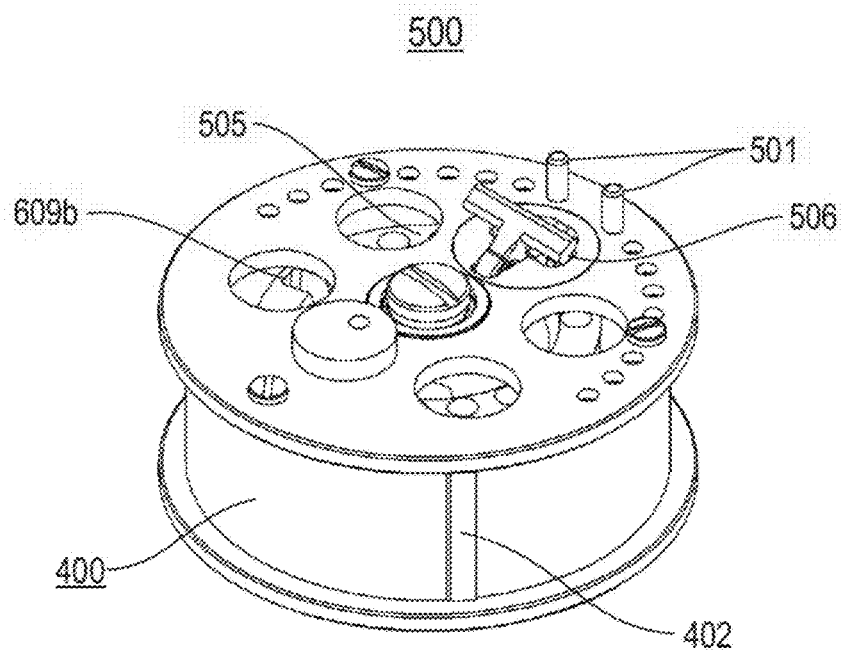
FIGS. 7A-7B are perspective views of a mechanized take-up reel for loading and unloading the tape storage medium, in accordance with another embodiment.
Figure 7B:
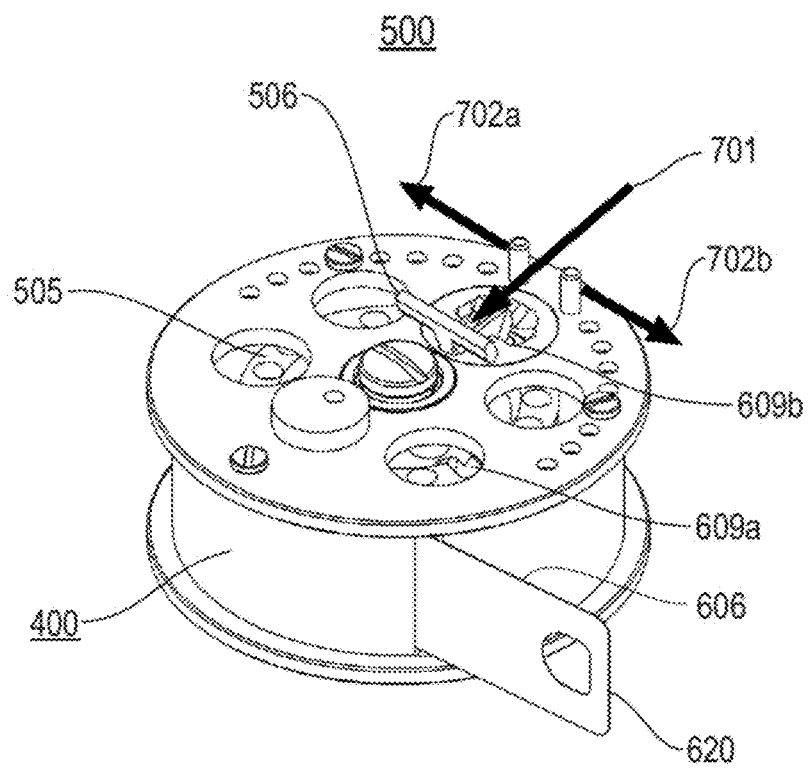

Referring now to FIGS. 7A-7B, perspective views of a mechanized take-up reel 500 for loading and unloading the tape storage medium are presented in accordance with one embodiment. As an option, the present mechanized take-up reel 500 may be implemented in conjunction with features from any other embodiment listed herein, such as those described with reference to the other Figures. Of course, however, such mechanized take-up reel 500 and others presented herein may be used in various applications and/or in permutations which may or may not be specifically described in the illustrative embodiments listed herein. Further, the mechanized take-up reel 500 presented herein may be used in any desired environment.

Figure 8A:
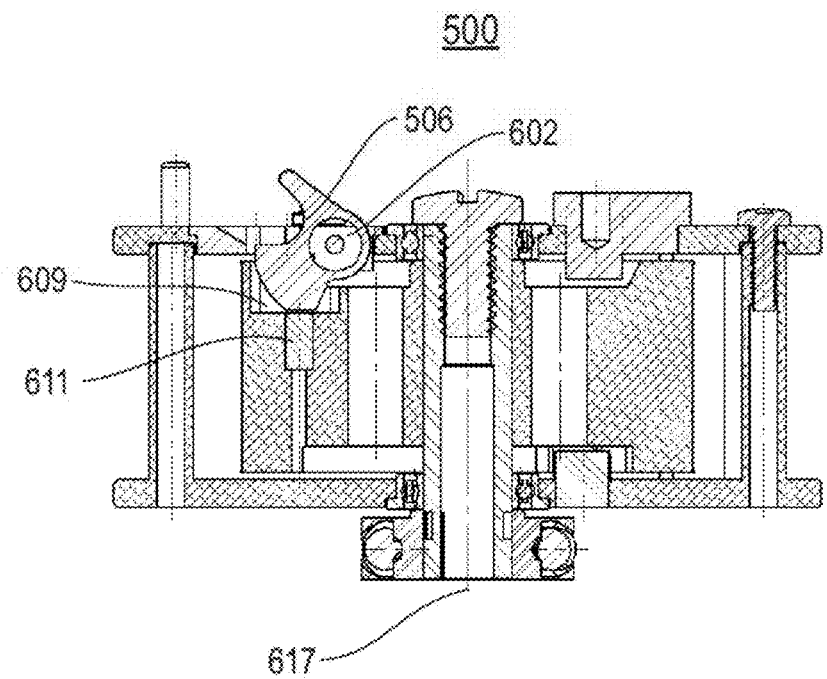
FIGS. 8A-8B are cross-sectional views of a mechanized take-up reel for loading and unloading the tape storage medium in accordance with yet another embodiment.
Figure 8B:
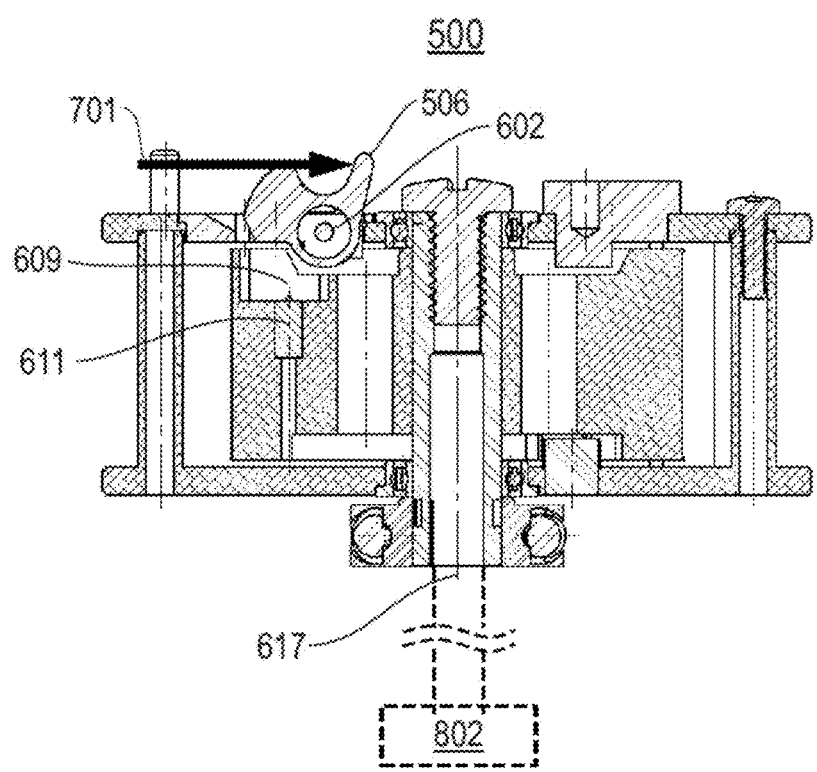

Rotation of inner hub 505 is preferably achieved using a motor (not shown) that may be coupled with inner hub 505 (e.g., see FIG. 8B). Moreover, with continued reference to FIGS. 7A-7B, coupling and decoupling of hub/flange 400 with inner hub 505 and hence the motor, is enabled by engagement and disengagement of pawl 506 with tapered groove 609. According to one approach, the tongue 606 may be coupled with inner hub 505 and is enabled to pass through slot 402 in hub/flange 400 by the rotation of inner hub 505 with respect to hub/flange 400.

In view of FIGS. 7A-7B, disengaging force 701 is applied to pawl 506. In accordance with one embodiment, clocking stop 501 is preferably able to couple with opposing tangential forces 702a and 702b. However, according to another embodiment, opposing tangential forces 702a, 702b may be applied to pawl 506 by a de-coupler actuator (not shown) external to mechanized take-up reel 500.

Referring to FIG. 7A, the mechanized take-up reel 500 is illustrated having pawl 506 engaged with tapered groove 609a. Tapered groove 609a is mostly obscured from view by pawl 506 in FIG. 7A. The coupling of tapered groove 609a with pawl 506 secures distal end 620 of tongue 606 inside mechanized take-up reel 500.

According to one embodiment, engagement of pawl 506 with tapered groove 609b locks tongue 606 in an extended position. Pawl 506 has a wedge shape to its walls, such that the pawl 506 is able to engage with angled walls of tapered groove 609. The apex of the wedge shape of pawl 506 is narrower than the opening of tapered groove 609 thereby enabling pawl 506 to enter into tapered groove 609 without contacting the opening of tapered groove 609.

With reference to FIG. 7B, pawl 506 is shown disengaged from tapered groove 609b. Furthermore, the pawl 506 is aligned for coupling with tapered groove 609b (mostly obscured). The tapered groove 609a is illustrated after inner hub 505 is rotated which enables a distal end 620 of tongue 606 to pass through slot 402. According to different approaches, the extent of rotation of inner hub 505 may be predetermined by the length of tongue 606 and a distance from slot 402 that it is to extend.

With pawl 506 disengaged from tapered grooves 609a, 609b, inner hub 505 is able to rotate independently from hub/flange 400. Opposing tangential forces 702a, 702b prevent hub/flange 400 from rotating substantially with respect to inner hub 505.

Once the disengaging force 701 is removed, the pawl 506 engages the tapered groove 609b, thereby nonrotatably coupling the inner hub 505 to the hub/flange 400. Moreover, the coupling of tapered groove 609b with pawl 506 secures the distal end 620 of tongue 606 outside of slot 402. In one approach, the coupling of tapered groove 609a with pawl 506 may secure tongue 606 inside mechanized take-up reel 500.

For clarification of the components of mechanized take-up reel 500 and their relationship to each other, FIGS. 8A-8B show cross-sections of mechanized take-up reel 500 for two positions of operation in accordance with one embodiment. With reference to FIG. 8A, pawl 506 is coupled with tapered groove 609. Magnet 611 pulls pawl 506 into contact with tapered groove 609. The wedge shape of pawl 506 enables pawl 506 to mesh with tapered groove 609. Pawl 506 pivots around pawl pivot bearing 602 which enables pawl 506 to couple with tapered groove 609.

With reference to FIG. 8B, disengaging force 701 is shown being applied to pawl 506. According to one approach, pawl 506 may be coupled with a de-coupler actuator (not shown) that may apply disengaging force 701. Disengaging force 701 is preferably strong enough to overcome the attractive force of magnet 611.

In accordance with one embodiment, the pawl 506 may couple with the de-coupler actuator for applying disengaging force 701 such that, when the de-coupler actuator is retracted, pawl 506 is rotated around pawl pivot bearing 602 and couples with tapered groove 609. Pawl 506 has a wedge shape to its walls, thereby preferably allowing the pawl 506 to engage with angled walls of tapered groove 609. The apex of the wedge shape of pawl 506 is narrower than the opening of tapered groove 609 thereby enabling pawl 506 to enter into tapered groove 609 without contacting the opening of tapered groove 609.

In one embodiment, pawl 506 engages inner hub 505 by coupling with tapered groove 609 in and/or coupled with a surface of inner hub 505 that is perpendicular to axis of rotation 617. It is to be understood that the location of a tapered groove and a pawl that engages the tapered groove is in no way intended to limit the scope of the invention.

Alternate embodiments may include different orientations and/or locations for the tapered groove 609 and/or pawl 506, e.g., other than what is presented.

With continued reference to FIGS. 8A-8B, mechanized take-up reel 500 is rotated around axis of rotation 617 by a motor 802. However, it is to be understood that the motor 802 for rotating mechanized take-up reel 500 is in no way intended to limit the scope of the present invention. Alternate embodiments may include using a drive belt, a rack and pinion, a gear train, etc. to rotate the mechanized take-up reel 500.

Referring now to FIGS. 9-12, perspective views of tongues 900, 1000, 1100, 1200 are shown in accordance with several embodiments. As an option, the present tongues 900, 1000, 1100, 1200 may be implemented in conjunction with features from any other embodiment listed herein, such as those described with reference to the other Figures. Of course, however, such tongues 900, 1000, 1100, 1200 and others presented herein may be used in various applications and/or in permutations which may or may not be specifically described in the illustrative embodiments listed herein. Further, the tongues 900, 1000, 1100, 1200 presented herein may be used in any desired environment. Thus FIGS. 9-12 (and the other Figures) should be deemed to include any and all possible permutations.

Referring now to FIGS. 9-12, the tongues 900, 1000, 1100, 1200 preferably include a spring-like material, e.g., that is resiliently deformable, thereby enabling the tongues 900, 1000, 1100, 1200 to maintain a generally flattened shape when unconstrained. Illustrative materials that may be suitable for any one or more of the tongues 900, 1000, 1100, 1200 include precipitation hardened stainless steel, work hardened stainless steel, hardened beryllium copper, plastic, etc., and/or any other spring-like material known to one of ordinary skill in the art of material science upon reading the present description.

In accordance with one embodiment, a tongue may include a single layer of spring-like material. However, in other embodiments, one or more of the tongues 900, 1000, 1100, 1200 may have a viscoelastic layer coupled with a spring-like material, e.g., thereby forming a multilayered tongue. According to different approaches, viscoelastic materials may include any conventional materials as would be well known and understood by one of ordinary skill in the art of vibration control upon reading the present description.

Vibration of any of the tongues 900, 1000, 1100, 1200 may limit the speed at which a mechanized take-up reel is able to accurately extend a tongue without inhibiting the tongue from coupling with a tape. However, as mentioned above, some approaches may couple a viscoelastic layer with a tongue, which may thereby enable the tongue to accurately extend faster than in the absence of a viscoelastic layer, e.g., by attenuating a natural frequency of the tongue's vibration.

Figure 9:
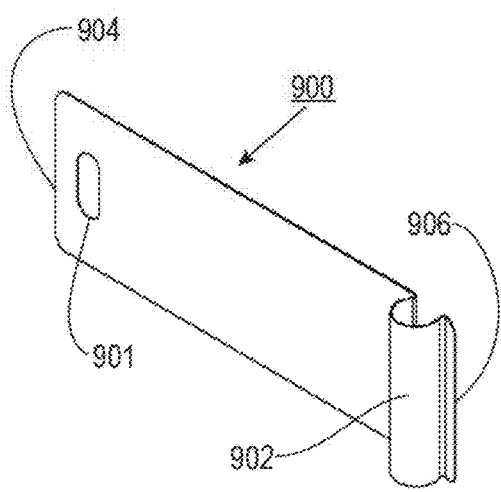
FIG. 9 is a perspective view of a component for a mechanized take-up reel for loading and unloading the tape storage medium in accordance with one embodiment.

Referring now to FIG. 9, the tongue 900 has a link slot 901 at one distal end 904 of tongue 900. According to the present embodiment, link slot 901 is a hollow place in tongue 900 and is bounded by at least one surface of tongue 900. According to one approach, link slot 901 may couple with a feature on an end of a flexible filament or ribbon such as a tape storage medium.

Moreover, the geometry of link slot 901 may be dependent upon the feature on the end of a flexible filament or ribbon. For example, link slot 901 is designed to enable maximum strength and rigidity at a distal end 904 of tongue 900 while coupling with a narrow feature on an end of a flexible filament or ribbon. Tongue 900 also includes hem 902 at another distal end 906 of tongue 900. Hem 902 is preferably formed in tongue 900 to couple with a groove and pin having radii similar to that of hem 902. However, according to different embodiments, hem 902 may include various elements such as a screw, weld, swage, adhesive, clamp, etc., or any other method or device known to one of ordinary skill in the art of joining technology.

Figure 10:
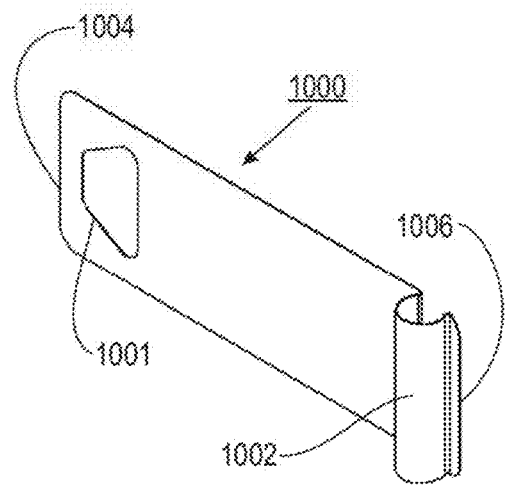
FIG. 10 is a perspective view of a component for a mechanized take-up reel for loading and unloading the tape storage medium in accordance with one embodiment.

With reference to FIG. 10, the tongue 1000 comprises link trapezoid 1001 at one distal end 1004 of tongue 1000. Link trapezoid 1001 is a hollow place in tongue 1000 and is bounded by at least one surface of tongue 1000. Link trapezoid 1001 may be able to couple with a feature on an end of a flexible filament or ribbon such as a tape storage medium. The geometry of link trapezoid 1001 is dependent upon the feature on the end of a flexible filament or ribbon. For example, link trapezoid 1001 may have localized flexibility at a distal end 1004 of tongue 1000 while coupling with a long feature on an end of a flexible filament or ribbon.

The tongue 1000 further includes a hem 1002 at another distal end 1006 of tongue 1000. Hem 1002 is formed in tongue 1000 to couple with a groove and pin having radii similar to that of hem 1002. According to various embodiments, hem 1002 may include various elements such as a screw, weld, swage, adhesive, clamp, etc., or any other element which would be apparent to one of ordinary skill in the art of joining technology.

Figure 11:
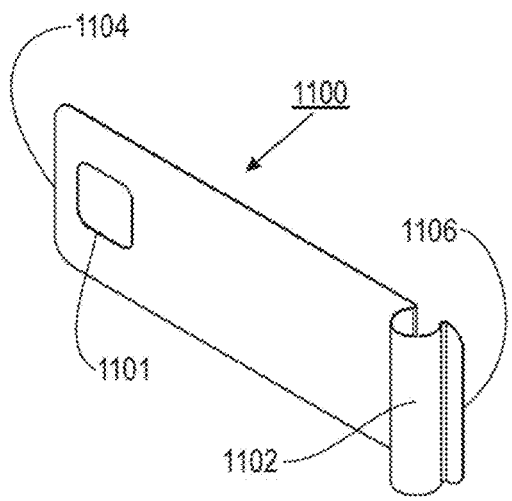
FIG. 11 is a perspective view of a component for a mechanized take-up reel for loading and unloading the tape storage medium in accordance with one embodiment.

Referring now to FIG. 11, a perspective view of a tongue 1100 is shown in accordance with another embodiment. Tongue 1100 comprise link square 1101 at one distal end 1104 of tongue 1100. Link square 1101 is a hollow place in tongue 1100 and is bounded by at least one surface of tongue 1100. Link square 1101 is preferably able to couple with a feature on an end of a flexible filament or ribbon such as a tape storage medium. The geometry of link square 1101 is dependent upon the feature on the end of a flexible filament or ribbon. For example, link square 1101 may have flexibility and strength at a distal end 1104 of tongue 1100 while coupling with a long feature on an end of a flexible filament or ribbon.

Tongue 1100 comprises a hem 1102 at another distal end 1106 of tongue 1100. The hem 1102 may be formed in tongue 1100 to couple with a groove and pin having radii similar to that of hem 1102. According to various embodiments, hem 1102 may include various elements such as a screw, weld, swage, adhesive, clamp, etc., or any other element which would be apparent to one of ordinary skill in the art of joining technology.

Figure 12:
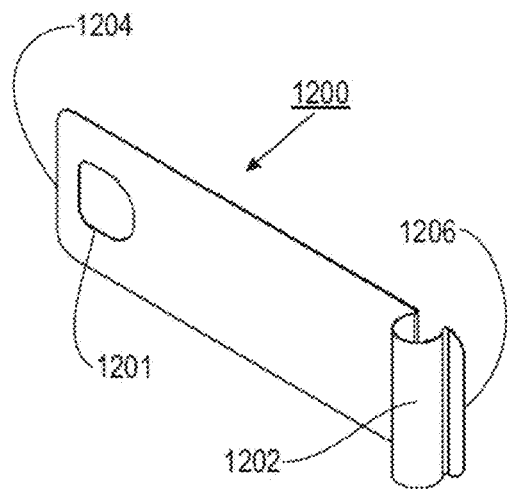
FIG. 12 is a perspective view of a component for a mechanized take-up reel for loading and unloading the tape storage medium in accordance with one embodiment.

With reference to FIG. 12, a perspective view of a tongue 1200 is shown in accordance with yet another embodiment. Tongue 1200 comprises link D-hole 1201 at one distal end 1204 of tongue 1200. Link D-hole 1201 is a hollow place in tongue 1200 and is bounded by at least one surface of tongue 1200. Link D-hole 1201 may be able to couple with a feature on an end of a flexible filament or ribbon such as a tape storage medium. The geometry of link D-hole 1201 is dependent upon the feature on the end of a flexible filament or ribbon. For example, link D-hole 1201 may have maxinmm strength and some flexibility at a distal end 1204 of tongue 1200 while coupling with a narrow feature on an end of a flexible filament or ribbon.

The tongue 1200 also includes a hem 1202 at another distal end 1206 of tongue 1200. Hem 1202 is formed in tongue 1200 to couple with a groove and pin having radii similar to that of hem 1202. According to various embodiments, hem 1202 may include various elements such as a screw, weld, swage, adhesive, clamp, etc., or any other element as would be appreciated by one of ordinary skill in the art of joining technology.

According to an illustrative embodiment, a tongue having a linking feature at one distal end and a coupling feature at another distal end may include designs other than those presented herein. Thus, it is to be understood that the embodiments presented here are in no way intended to limit the invention.

Operation

Methods and process steps thereof are presented in FIGS. 13-16 with respect to loading and unloading a tape storage medium. It is to be understood that the tape storage medium is an example of a filament or ribbon and embodiments are not limited to the loading and unloading of a tape storage medium.

The process steps of the various embodiments presented herein are preferably carried out (e.g., performed) by processors, electrical components, assembly mechanisms, etc., which may be under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in the processes of the various methods herein, such steps are exemplary. That is, the embodiments presented herein are well suited to perform various other steps or variations of the steps recited in the processes herein. It should also be appreciated that the steps of the processes described herein may be performed by software, by hardware, by an assembly mechanism, through human interaction, etc., and/or any combination of software, hardware, assembly mechanism, and human interaction.

Figure 13:
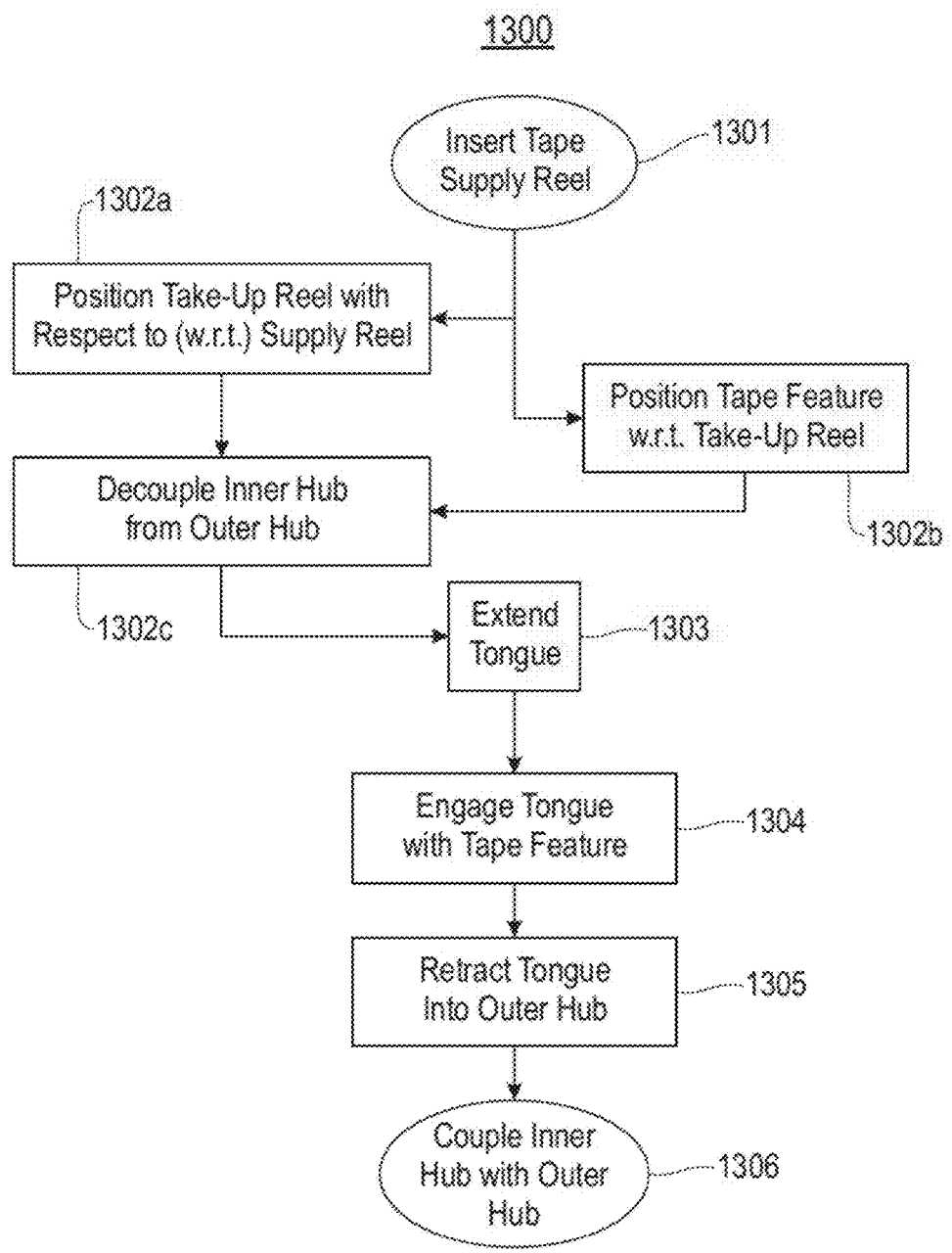
FIG. 13 is a flow chart of a method for loading the tape storage medium in accordance with one embodiment.

FIG. 13 is a flow chart of a method 1300 in which particular steps are performed in accordance with one embodiment, for loading a filament or a ribbon, such as a tape storage medium that uses mechanized take-up reel 100. As an option, the present method 1300 may be implemented in conjunction with features from any other embodiment listed herein, such as those described with reference to the other Figures, such as FIGS. 3A-3E. Of course, however, such method 1300 and others presented herein may be used in various applications and/or in permutations which may or may not be specifically described in the illustrative embodiments listed herein. Further, the method 1300 presented herein may be used in any desired environment. Thus FIG. 13 (and the other Figures) should be deemed to include any and all possible permutations.

Referring now to FIG. 13, the method 1300 includes inserting a tape supply reel. See step 1301. According to one approach, the tape supply reel may be wound with a tape storage medium according to any of the embodiments described herein. Moreover, an end of the tape wound on the tape supply reel may be able to couple with a tongue (e.g., see tongue 213).

Step 1302a of method 1300, includes positioning a mechanized take-up reel with respect to a tape supply reel. According to one approach, positioning a mechanized take-up reel (e.g., see 100 of FIGS. 3A-3D) may include rotation of the mechanized take-up reel so that a slot therein is in a desirable position, e.g., to couple with the tape wound on the tape supply reel. The position of the mechanized take-up reel may include a change to the distance between mechanized take-up reel and the tape supply reel, preferably so that the mechanized take-up reel is in a position to couple with the tape wound on the tape supply reel.

With continued reference to FIG. 13, step 1302b of method 1300 includes positioning a feature coupled to a tape storage medium on the tape supply reel with respect to mechanized take-up reel. The position of the tape feature may include rotation of the tape supply reel, e.g., such that the tape feature may be able to couple with tongue 213 of mechanized take-up reel 100.

Step 1302e of method 1300 includes rotatably decoupling an inner hub of the mechanized take-up reel from an outer hub of the mechanized take-up reel, e.g., by rotating a pawl. According to one approach, decoupling the inner hub from outer hub (e.g., see 105, 101 respectively of FIGS. 3A-3E) includes a pawl being disengaged from a tapered groove in and/or coupled with the inner hub. Moreover, the pawl may be disengaged from the tapered groove resulting from an application of disengaging force to a pawl engager as described above with reference to FIG. 5.

With continued reference to FIG. 13, it should be noted that steps 1302a and 1302b of method 1300 may be performed sequentially in any order or in parallel, depending on the desired embodiment. Furthermore, step 1302c is desirably preceded by step 1302a for efficiency of method 1300, e.g., for loading a filament or a ribbon such as the tape storage medium onto mechanized take-up reel 100.

The method 1300 further includes extending a tongue of the mechanized take-up reel. See step 1303. According to one approach, the tongue may be extended by creating relative motion between the inner hub and outer hubs. Moreover, the rotation of outer hub 101 may be inhibited during the rotation of inner hub 105 by the application of a tangential force (e.g., see 303a, 303b of FIG. 3B). In different embodiments, relative motion between the inner hub and outer hubs may be achieved using a motor, a drive belt, a rack and pinion, a gear train, etc., without deviating from the spirit and scope of the various embodiments described herein.

Referring still to FIG. 13, step 1304 includes engaging the tongue with the tape feature. As described above, the tape feature is preferably able to couple with the tongue. According to a preferred embodiment, having achieved a desirable position of the tape feature with respect to the take-up reel in steps 1302a and 1302b, the tongue may be approximately tangent with the tape wrapped on the tape supply reel. Thus, by rotating the tape supply reel and/or mechanized take-up reel, the tape feature may preferably be positioned to couple with the tongue of mechanized take-up reel.

Step 1305 of method 1300 includes retracting the tongue and feature into the outer hub. In order to retract the tongue into the outer hub, relative motion between the inner and outer hubs is preferably created, e.g., in a direction opposite to the direction of the relative motion performed in step 1303 to extend the tongue. According to one approach, the rotation of outer hub 101 may be inhibited during the rotation of inner hub by the application of tangential force (e.g., see 303a, 303b of FIG. 3B). In different embodiments, rotation of the inner and/or outer hubs may be achieved using a motor, a drive belt, a rack and pinion, a gear train, etc.

Furthermore, in step 1306, method 1300 includes non-rotably coupling the inner hub with the outer hub e.g., by causing the pawl to engage the inner hub. According to one approach, prior to effecting the nonrotatably coupling, the inner hub may be rotated with respect to outer hub such that the pawl is about aligned with a tapered groove (e.g., see 209 of FIGS. 3A-3B). Additionally, a disengaging force may be removed, thereby preferably allowing a spring 211 to bias the pawl 207 towards the tapered groove 209 such that it is coupled therewith (e.g., see 211, 207, 209 of FIG. 2 respectively), thereby nonrotably coupling the inner hub with the outer hub. As a result, a filament or a ribbon such as the tape storage medium may be wound around outer hub 101.

Although method 1300 includes the process steps for loading a tape, filament or a ribbon, according to an exemplary embodiment, the tape, filament or ribbon may be unloaded to the supply reel as presented in method 1400.

Figure 14:
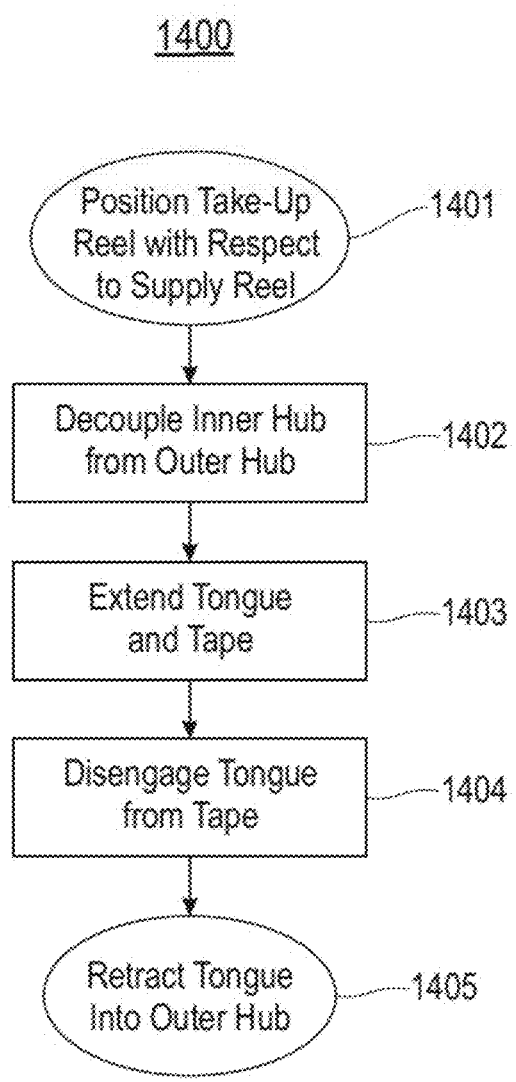
FIG. 14 is a flow chart of a method for unloading the tape storage medium in accordance with one embodiment.

FIG. 14 is a flow chart of a method 1400 in which particular steps are performed in accordance with one embodiment for unloading a tape, filament or a ribbon such as a tape storage medium that uses a mechanized take-up reel. As an option, the present method 1400 may be implemented in conjunction with features from any other embodiment listed herein, such as those described with reference to the other Figures, such as FIGS. 3A-3E. Of course, however, such method 1400 and others presented herein may be used in various applications and/or in permutations which may or may not be specifically described in the illustrative embodiments listed herein. Further, the method 1400 presented herein may be used in any desired environment. Thus FIG. 14 (and the other Figures) should be deemed to include any and all possible permutations.

Referring now to FIG. 14, step 1401 of method 1400 includes positioning a mechanized take-up reel with respect to a tape supply reel. According to one embodiment, positioning a mechanized take-up reel may include rotating the mechanized take-up reel so that a slot therein is in an angular orientation to decouple from the tape wound on the tape supply reel. The positioning of mechanized take-up reel may comprise a change to the distance between the mechanized take-up reel and the tape supply reel, e.g., preferably such that the mechanized take-up reel is in a location to decouple with a feature coupled to the tape wound on the tape supply reel (e.g., see FIG. 3E).

Method 1400 further includes rotatably decoupling an inner hub of the mechanized take-up reel from an outer hub of the mechanized take-up reel. See step 1402. According to one approach, the inner hub may be rotatably decoupled from the outer hub by disengaging the pawl from a tapered groove (e.g., see 209 of FIGS. 3A-3B). Moreover, to disengage the pawl from the tapered groove, a disengaging force may be applied to pawl engager.

With continued reference to FIG. 14, the method 1400 includes extending a tongue coupled with the tape storage medium. See step 1403. To extend the tongue and tape coupled thereto, the inner hub may be rotated with respect to outer hub. Moreover, the rotation of outer hub 101 may be inhibited during the rotation of inner hub by the application of tangential forces (e.g., see 303a, 303b of FIG. 3B). As described above, rotation of the inner and/or outer hubs may be achieved using a motor, a drive belt, a rack and pinion, a gear train, etc.

Step 1404 of method 1400 includes disengaging the tongue from the tape storage medium. Having achieved desirable positioning in step 1402, the tongue may disengage from the end of the tape having a feature coupled thereto. According to one approach, to disengage the tongue from the end of the tape includes rotating the tape supply reel such that the tape feature disengages from tongue of the mechanized take-up reel.

The method 1400 further includes retracting the tongue into the outer hub. See step 1405. However, in some approaches, operation step 1405 may not be performed. For example, after the tongue is disengaged from the tape storage medium in step 1404, the tongue may remain extended, e.g., to engage with a tape feature of another tape supply reel. According to one approach, which is in no way intended to limit the invention, by selectively refraining from performing operation step 1405, the tongue may not need to be extended in step 1303 of FIG. 13. This may enable faster access times when multiple load/unload requests for multiple tape storage reels are being processed by one or more tape drives.

Figure 15:
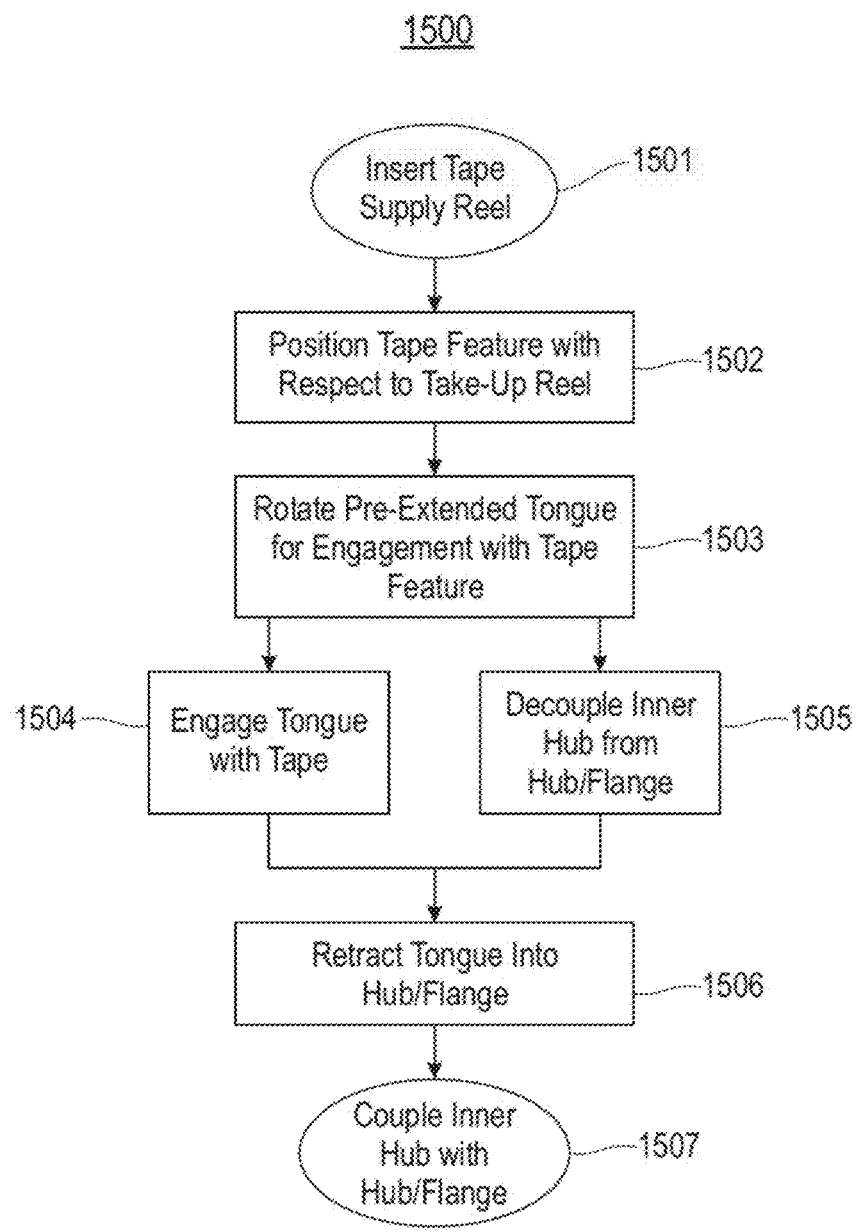
FIG. 15 is a flow chart of a method for loading the tape storage medium in accordance with one embodiment.

FIG. 15 is a flow chart of a method 1500 in which particular steps are performed in accordance with one embodiment, for using a mechanized take-up reel for loading a tape, filament or a ribbon such as one wound onto a tape storage medium. As an option, the present method 1500 may be implemented in conjunction with features from any other embodiment listed herein, such as those described with reference to the other Figures, such as FIGS. 7A-7B, and 8A-8B. Particularly, with reference to FIG. 7B, the pawl 506 is shown disengaged from tapered groove 609b. In accordance with one embodiment, the mechanized take-up reel 500 may be initialized for the pawl 506 to engage the tapered groove 609b. Moreover, engaging pawl 506 with tapered groove 609b may lock the tongue 606 in an extended position, as will soon become apparent.

Referring again to FIG. 15, such method 1500 and others presented herein may be used in various applications and/or in permutations which may or may not be specifically described in the illustrative embodiments listed herein. Further, the method 1500 presented herein may be used in any desired environment. Thus FIG. 15 (and the other Figures) should be deemed to include any and all possible permutations.

Step 1501 of method 1500 includes inserting a tape supply reel, e.g., into an apparatus as described above. According to one approach, the tape supply reel may be wound with a tape storage medium. Moreover, a free end of the tape wound on the tape supply reel may be able to operatively couple with tongue 606, e.g., via a tape feature attached to the tape.

In step 1502 of method 1500, a tape feature coupled with the end of the tape wound on the tape supply reel is positioned with respect to a mechanized take-up reel. The position of the tape feature depends at least in part on rotation of the tape supply reel. In a preferred approach, the feature may be positioned such that the tape feature couples with a tongue of a mechanized take-up reel (e.g., see 606 of FIG. 6).

In step 1503 of method 1500, the tongue, which has been pre-extended, is rotated with respect to the tape supply reel. Rotation of tongue 606 comprises rotation of mechanized take-up reel 500 so that tongue 606, which has been pre-extended, is approximately tangent to an outer most layer of tape wrapped onto the supply reel.

Furthermore, in step 1504 of method 1500, the tongue engages with the tape, e.g., preferably at the end having the feature that is able to couple with tongue 606. Having achieved a desirable distance between mechanized take-up reel 500 and the tape supply reel in step 1502, and approximate tangency in step 1503 of tongue 606 to an outer most layer of tape wrapped onto the supply reel, to engage the tongue with the tape includes rotating the supply reel such that the end of the tape having the feature coupled thereto, preferably engages the tongue 606.

With continued reference to FIG. 15, in step 1505 of method 1500, the inner hub is decoupled from outer hub/flange. According to one approach, the inner hub may be decoupled from outer hub/flange by disengaging the pawl

506 from the tapered groove 609*b*, e.g., by applying a disengaging force 701 to pawl 506.

It should be noted that steps 1504 and 1505 of method 1500 may be performed sequentially in any order or in parallel. Steps 1504 and 1505 are presented in parallel for efficiency of method 1500 for loading a filament or a ribbon such as the tape storage medium onto mechanized take-up reel 500, but are in no way limited to being performed as such.

In step 1506 of method 1500, the tongue is retracted into the hub/flange. According to one approach, the tongue may be retracted into the hub/flange by creating relative motion between the inner hub 505 and hub/flange 400, in a direction opposite to that direction rotated to extend tongue 606 during initialization of mechanized take-up reel 500. Moreover, the rotation of hub/flange 400 may be inhibited during the rotation of inner hub 505 by the application of tangential forces 702*a*, 702*b*. Rotation of inner hub 505 may be achieved using a motor, a drive belt, a rack and pinion, a gear train, etc., without deviating from the spirit and scope of the present embodiment.

Referring still to FIG. 15, in step 1507 of method 1500, the inner hub is coupled with outer hub/flange. According to one approach, coupling the inner hub 505 with the hub/flange 400 comprises inner hub 505 rotated with respect to hub/flange 400 such that the pawl 506 is about aligned with tapered groove 609*b*. Disengaging force 701 may also be removed by removing the de-coupler actuator (not shown) that applies disengaging force 701.

According to one approach, pawl 506 may be engaged by the de-coupler actuator for applying disengaging force 701 such that when the de-coupler actuator is retracted, pawl 506 is rotated around pawl pivot bearing 602 and couples with tapered groove 609, thereby coupling inner hub 505 with outer hub/flange 400.

The method 1500 may further include an optional step (not shown), in which a tape, filament or a ribbon, such as the tape storage medium, may be wound around the hub/flange. As described above, the end of the tape that is coupled with tongue 606 is retracted inside hub/flange 400.

While the method 1500 of FIG. 15 is for loading a tape storage medium, the tape storage medium may be unloaded as presented in method 1600.

Figure 16:
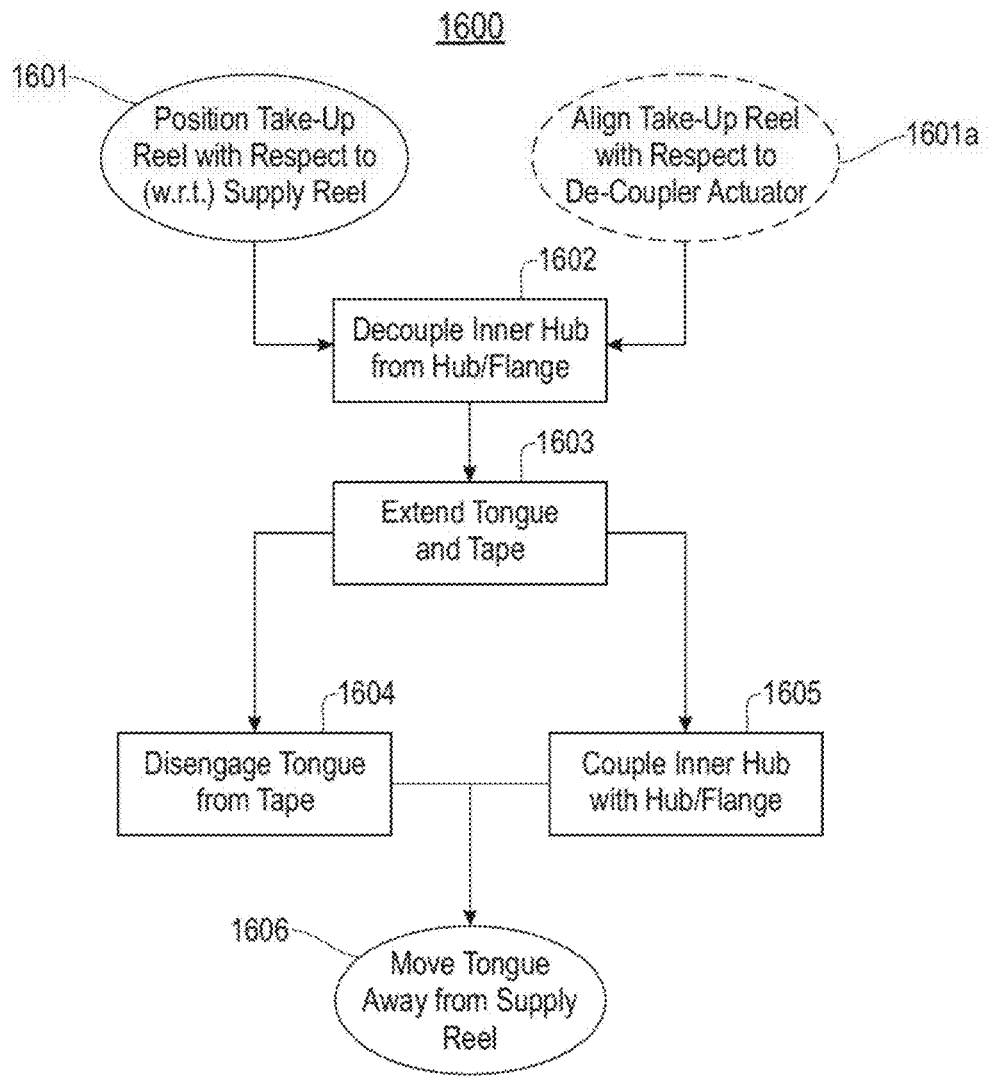
FIG. 16 is a flow chart of a method for unloading the tape storage medium in accordance with one embodiment.

FIG. 16 is a flow chart of a method 1600 in which particular steps are performed in accordance with an embodiment for unloading a tape, filament or a ribbon such as the tape storage medium that uses mechanized take-up reel 500. As an option, the present method 1600 may be implemented in conjunction with features from any other embodiment listed herein, such as those described with reference to the other Figures, such as FIGS. 7A-7B, and 8A-8B.

Of course, however, such method 1600 and others presented herein may be used in various applications and/or in permutations which may or may not be specifically described in the illustrative embodiments listed herein. Further, the method 1600 presented herein may be used in any desired environment. Thus FIG. 16 (and the other Figures) should be deemed to include any and all possible permutations.

In step 1601 of method 1600, a mechanized take-up reel is positioned with respect to the tape supply reel. Position of mechanized take-up reel 500 comprises rotation of mechanized take-up reel 500 so that a slot 402 is in a desirable angular orientation, e.g., to decouple a tongue of the take-up reel, from the tape wound on the tape supply reel. The position of mechanized take-up reel 500 may include making a change to a distance between mechanized take-up reel 500 and the tape supply reel so that mechanized take-up reel 500 is in a desirable location.

Furthermore, in step 1601*a* of method 1600, the mechanized take-up reel is aligned with respect to a de-coupler actuator mechanism. Step 1601*a* is desirable when the de-coupler actuator mechanism does not include an optimum location for coupling with pawl 506. Moreover, according to one approach, the position of the mechanized take-up reel 500 includes rotation of the mechanized take-up reel 500 so that the pawl 506 is in desirable angular orientation, e.g., relative to the de-coupler actuator mechanism.

In step 1602 of method 1600, an inner hub is decoupled from the hub/flange. According to one approach, the inner hub 505 may be decoupled from the hub/flange 400 by disengaging the pawl 506 from the tapered groove 609*a*, e.g., by applying a disengaging force 701 to pawl 506.

Referring still to FIG. 16, in step 1603 of method 1600, a tongue coupled with tape from the supply reel is extended. According to one approach, the tongue may be extended by rotating the inner hub 505 with respect to hub/flange 400. The rotation of hub/flange 400 may be inhibited during the rotation of inner hub 505 by the application of tangential forces 702*a*, 702*b* to clocking stop 501, as described above.

In step 1604 of method 1600, the tongue is disengaged from the tape feature at the end of the tape. Having achieved a desirable position of the mechanized take-up reel in step 1601, the tongue 606 may disengage from the end of the tape having the feature coupled thereto. According to one approach, disengage tongue 606 from the tape includes rotating the tape supply reel such that the end of the tape having the feature disengages from tongue 606 of mechanized take-up reel 500.

With continued reference to method 1600, in step 1605, the inner hub is coupled with the hub/flange. According to one approach, the inner hub 505 may be coupled with the hub/flange 400 by rotating the inner hub 505 with respect to hub/flange 400 such that pawl 506 is aligned with tapered groove 609*b*. Moreover, a de-coupler actuator that applies disengaging force 701 to pawl 506 may be retracted. Pawl 506 is preferably able to couple with the de-coupler actuator for applying disengaging force 701 such that, when the de-coupler actuator is retracted, pawl 506 is rotated around pawl pivot bearing 602 and couples with tapered groove 609*b*. Hence tongue 606 is locked in an extended position from hub/flange 400.

In step 1606 of method 1600, tongue is moved away from the supply reel. According to one approach, moving tongue 606 from the supply reel may include rotating the mechanized take-up reel 500 so that tongue 606 is in an angular orientation to avoid interference with the initialization of method 1500. The position of mechanized take-up reel 500 comprises a change to the distance between mechanized take-up reel 500 and the tape supply reel so that mechanized take-up reel 500 is in a location to avoid interference with the initialization of method 1500.

Advantageously, the various embodiments presented herein allow for rapid loading and unloading of the tape storage mediumi to and from a tape supply reel. The balanced inertia and low mass of the mechanized take-up reel enables the rapid loading and unloading of a tape storage medium. The low mass of the tongue, which couples with the tape storage medium, also enables the mechanized take-up reel to rapidly load and unload the tape storage medium.

It will be clear that the various features of the foregoing systems and/or methodologies may be combined in any way, creating a plurality of combinations from the descriptions presented above.

Exemplary Systems, Apparatuses and Complementary Components

FIGS. 17A-17D are perspective views of an illustrative product 1700 having a feature usable with a mechanized take up reel according to various embodiments described herein. As an option, the present product 1700 may be implemented in conjunction with features from any other embodiment listed herein, such as those described with reference to the other Figures. Of course, however, such product 1700 and others presented herein may be used in various applications and/or in permutations which may or may not be specifically described in the illustrative embodiments listed herein. Further, the product 1700 presented herein may be used in any desired environment. Thus FIGS. 17A-17D (and the other Figures) should be deemed to include any and all possible permutations.

Looking to FIGS. 17A-17D, the illustrative product 1700 is depicted as having a reel 1702. Depending on the embodiment, the reel 1702 may be a device, such as a cylinder, spool, frame, etc. that is rotatable about an axis, e.g., when mounted on a chuck, and is used for winding and storing tape, film, or other flexible materials.

With continued reference to FIGS. 17A-17D, the product 1700 also includes a tape 1704 coupled to the reel 1702. The tape 1704 may be a conventional tape of any type, preferably a magnetic recording tape, but is not limited thereto. Moreover, according to various approaches, the tape 1704 may be coupled to the reel 1702 using any conventional method, e.g., a bonding agent, fastener, a groove, etc.

Furthermore, a tape leader 1708 is shown as being coupled to a free end of the tape 1704. With reference to the present description, the "free end" of the tape 1704 is defined as the end of the tape 1704 that is unwound from the reel 1702 first. In other words, the free end of the tape 1704 is the end of the tape 1704 which is opposite the end coupled to the reel 1702. Thus, one end of the tape 1704 is preferably coupled to the reel 1702, while the other end of the tape 1704 (the free end) is coupled to the tape leader 1708.

According to one approach, the tape leader 1708 may be wrapped around the reel over the tape 1704. Thus the tape leader may prevent damage that may be caused to the tape 1704 when the tape 1704 is wrapped around the reel 1702, e.g., due to contaminants, accidental contact with the tape 1704, etc.

Additionally the product 1700 includes a feature which is coupled to the tape leader 1708. According to the present description, the feature includes a spring-like clip 1706 which is used to further describe the present embodiment in relation to FIGS. 17A-17D, but may also be used in conjunction with any of the embodiments described herein.

Figure 17A:
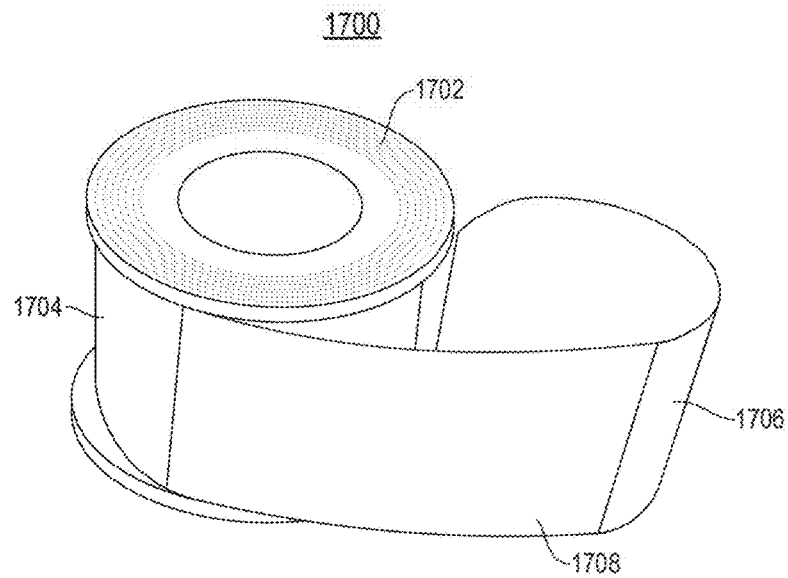
FIGS. 17A-17D are perspective views of a product, according to one embodiment.

Looking still to FIGS. 17A-17D, the clip 1706 also includes an engagement feature 1710. According to a preferred approach, the engagement feature 1710 may be designed to enable the clip 1706 to be pulled from a wrapped position, thereby decoupling the clip 1706 from the wound body of tape 1704, and allowing the tape 1704 to be unwound from the reel 1702, e.g., as shown in FIG. 17A.

The engagement feature 1710 preferably enables high speed automated engagement and/or disengagement of the clip 1706 from the reel 1702. Thus, the engagement feature 1710 is preferably able to be easily and reliably engaged by a mechanism (e.g., a transfer mechanism) to disengage of the clip 1706 from the reel 1702, and transfer the clip 1706 onto a take-up reel e.g., see 1910 of FIGS. 19A-19C. This engagement may also be easily reversed when unloading the clip 1706 from the take-up reel, and engaging it back onto the reel 1702.

Figure 17B:
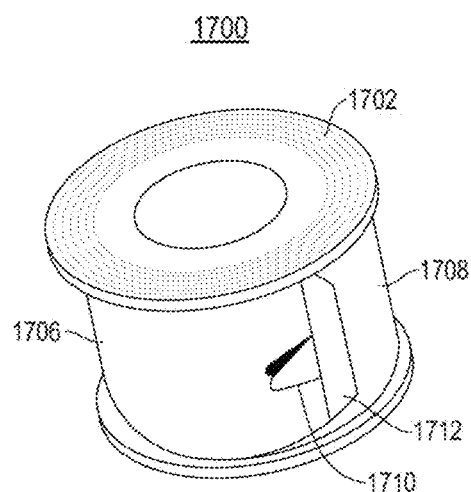
Figure 17C:
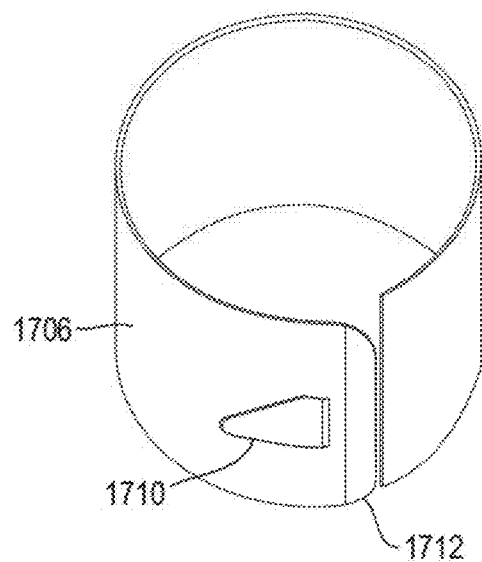
Figure 17D:
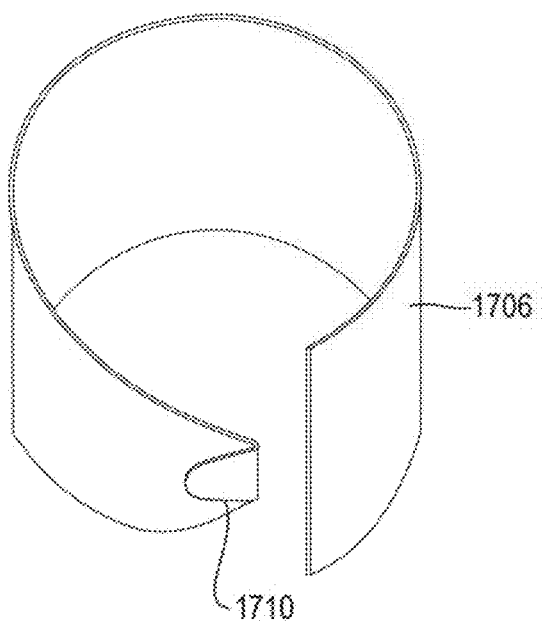

Additionally, as illustrated in FIGS. 17B-17C, a free end of the clip 1706, which is opposite the end of the clip 1706 coupled to the tape 1704, may have a bent portion 1712, which preferably angles away from the tape when the clip is in a wrapped position around the spooled tape. Depending on the preferred approach, the bent portion 1712 may be for at least one of (i) enabling optical detection of the bent portion 1712 and (ii) keeping the free end of the clip 1706 off of the tape 1704, thereby preventing damage to the tape 1704 otherwise caused by an edge of the free end of the clip coming into contact with the tape leader 1708 and/or tape 1704 thereunder. Thus, according to an illustrative approach, to enable optical detection of the bent portion 1712, a tape drive may inchlude an optical detector, which is preferably able to detect an optical signal reflected off the bent portion 1712 of the clip 1706, as will be discussed in detail below.

Figure 18:
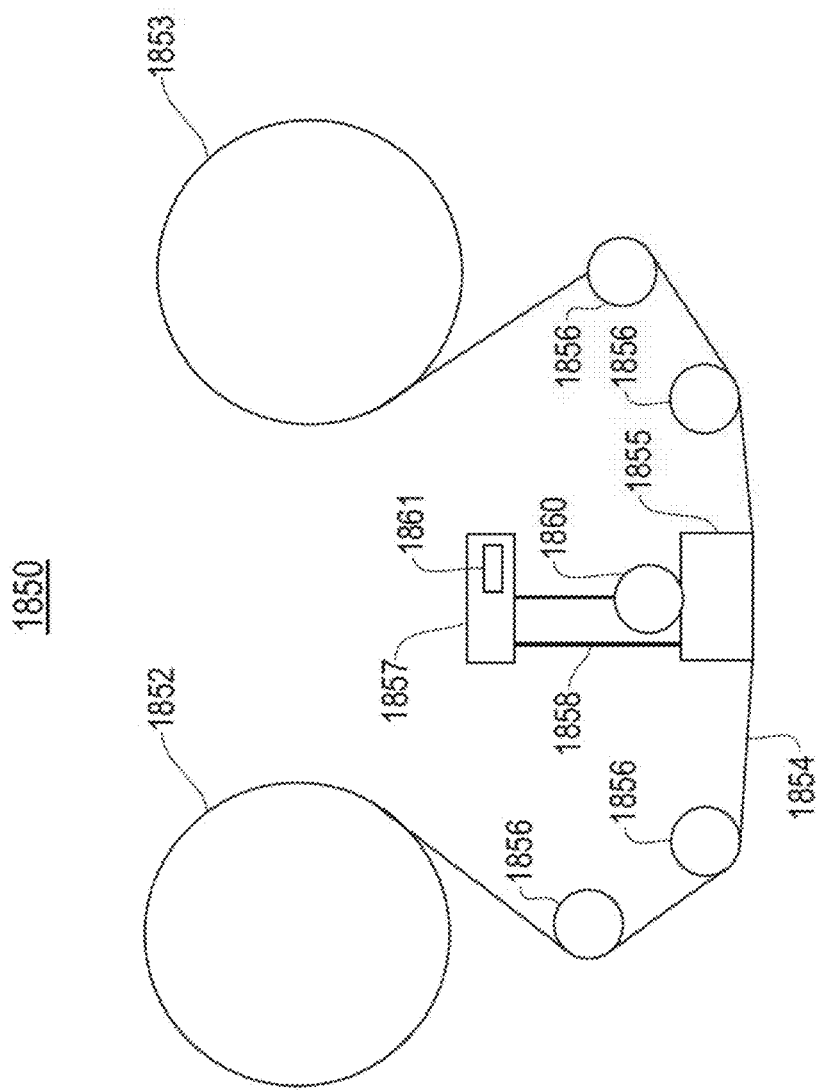
FIG. 18 is a schematic diagram of a simplified tape drive system according to one embodiment.

FIG. 18 illustrates a simplified view of a tape drive apparatus 1850 of a tape-based data storage system, which may be employed in combination with any of the embodiments described herein. Of course, however, such tape drive 1850 and others presented herein may be used in various applications and/or in permutations which may or may not be specifically described in the illustrative embodiments listed herein. Thus, while one specific implementation of a tape drive is shown in FIG. 18, it should be noted that the embodiments described herein may be implemented in the context of a variety of tape drive systems. Further, the tape drive 1850 presented herein may be used in any desired environment.

As shown in FIG. 18, a tape supply reel 1852 and a take-up reel 1853 are provided to support a tape 1854. According to preferred embodiments, take-up reel 1853 may include any of the approaches described herein, e.g., with reference to mechanized take-up reel 100 of FIGS. 1-3D.

With continued reference to FIG. 18, one or more of the reels may form part of a removable cartridge and are not necessarily part of the tape drive 1850. The tape drive 1850 may further include drive motor(s) to drive the tape supply reel 1852 and the take-up reel 1853 to move the tape 1854 over a tape head 1855 of any type. Such head may include an array of readers, writers, or both.

Although a tape drive 1850 may be capable of both reading and writing linear media, it may be preferable for a given drive or drives to perform only one of these operations (i.e., reading or writing) for an extended period of time. Additionally, there may be a cost advantage in having separate linear media drives due to the reduced amount of electronics, heads, etc. Moreover, since the sequential write method provides higher effective random write performance, system cost may be reduced by combining a number of write drives with a larger number of read-only drives. Thus, it may be preferable for at least a subset, a majority, all, etc. of the drives in a linear storage media tier to be optimized for writing or reading exclusively.

Guides 1856 guide the tape 1854 across the tape head 1855. Such tape head 1855 is in turn coupled to a controller assembly 1857 via a cable 1858. The controller 1857 typically controls head functions such as servo following, writing, reading, etc. The controller may operate under logic known in the art, as well as any logic disclosed herein. The cable 1858 may include read/write circuits to transmit data to the head 1855 to be recorded on the tape 1854 and to receive data read by the head 1855 from the tape 1854. An actuator 1860 controls the position of the head 1855 relative to the tape 1854.

An interface 1861 may also be provided for communication between the tape drive and a host (integral or external) to send and receive the data and for controlling the operation of the tape drive and communicating the status of the tape drive to the host, all as will be understood by those of skill in the art.

Figure 19A:
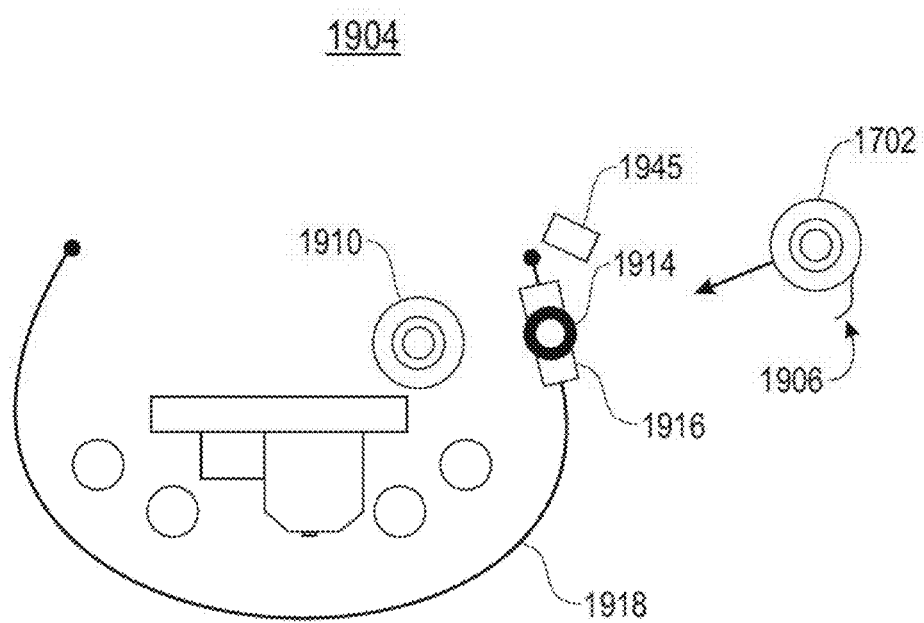
FIGS. 19A-19C are schematic representations of tape threading using a mobile robot, according to one embodiment.
Figure 19B:
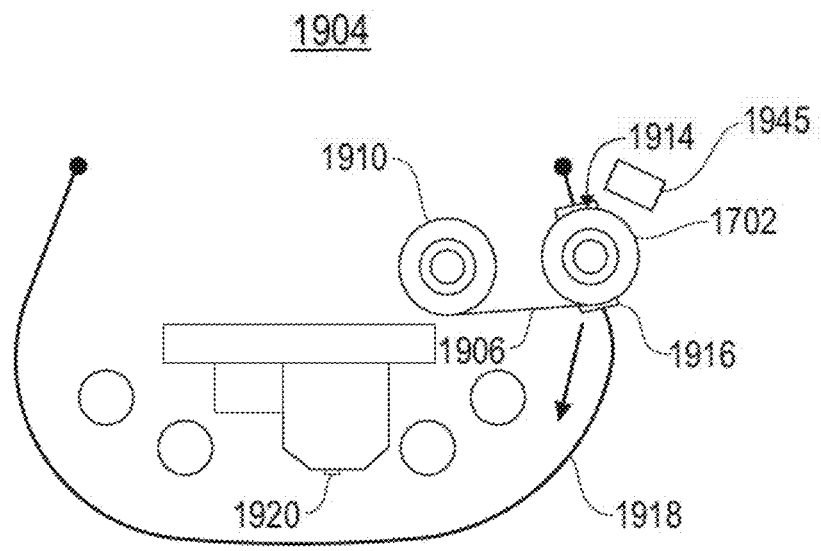
Figure 19C:
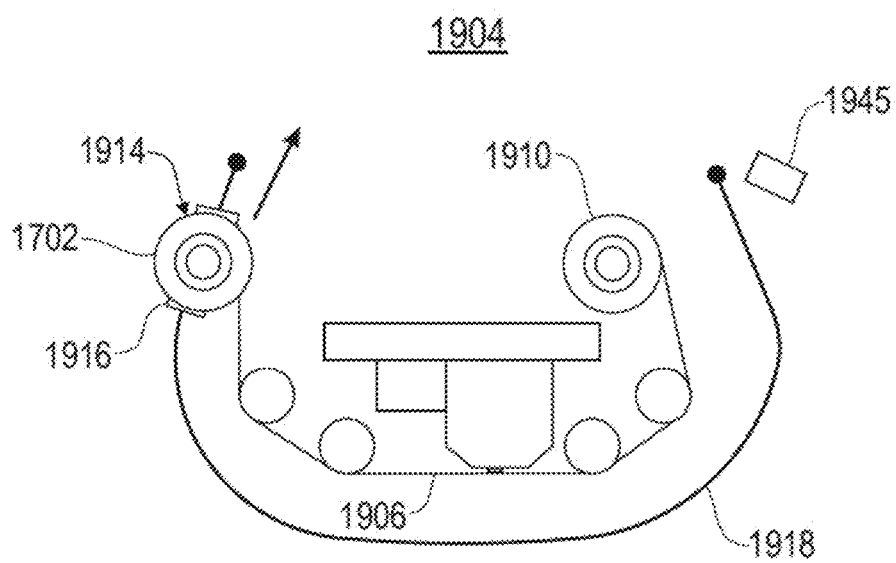

FIGS. 19A-19C depict schematic representations of a tape drive 1904, in accordance with one embodiment. As an option, the present tape drive 1904 may be implemented in conjunction with features from any other embodiment listed herein, such as those described with reference to the other Figures, such as FIGS. 17A-17D. Accordingly, various components of FIGS. 19A-19C have common numbering with those of FIGS. 17A-17D.

Of course, however, such tape drive 1904 and others presented herein may be used in various applications and/or in permutations which may or may not be specifically described in the illustrative embodiments listed herein. Further, the tape drive 1904 presented herein may be used in any desired environment. Thus FIGS. 19A-19C (and the other Figures) should be deemed to include any and all possible permutations.

As shown in FIGS. 19A-19C, a single reel 1702 of tape 1906 may be loaded onto a reel chuck 1914 and motor, e.g., for rotating the reel 1702, which are fixed to a carriage 1916 that is adapted to follow a guide 1918 that allows for motion of the chuck 1914 around the tape drive 1904 to facilitate threading of the tape 1906. Before loading the reel 1702 on the chuck 1914, the chuck 1914 is brought into proximity of the inboard (take-up) reel 1910, as shown in FIG. 19A. According to preferred embodiments, take-up reel 1910 may include any of the approaches described herein, e.g., with reference to mechanized take-up reel 100 of FIGS. 1-3D and/or other embodiments.

Referring now to FIG. 19B, after the mobile robot (not shown for clarity) places the reel 1702 on the chuck 1914, a procedure to couple the tape 1906 to the take up reel 1910 is performed. See, e.g., the method of FIG. 13. At this point, the tape 1906 may be transferred between reels 1902 and 1910 as part of a preliminary locate operation, before the tape 1906 contacts the recording head 1920 or any guide surfaces, such as rollers, thus enabling faster tape locate with reduced tape damage and drive wear.

In a further approach, during the loading process described above, it may be beneficial to detect the rotational orientation of the reel 1702, e.g., such that an engagement feature of a clip coupled to the reel 1702 may be located. This location may be accomplished using a beam of light that is reflected off of a feature on the clip. This feature may include a small reflector positioned at an angle with respect to the circumference of the clip that reflects the light beam into a detector, e.g., a bent portion 1712 as presented in FIGS. 17b-17C.

Therefore, according to one approach, an optical detector 1945, of a type known in the art, may be used as a part of the process of attaching the end of the tape 1906 to the take-up reel 1910, as described above. The optical detector 1945 is preferably used for detecting an orientation of a clip having a bent portion 1712 and/or the engagement feature 1710, e.g., as described above with reference to FIGS. 17A-17D.

Referring still to FIG. 19B, as the chuck 1914 rotates the reel 1702, the optical detector 1945, and/or a light source (not shown), may emit an optical signal towards a clip coupled to the reel 1702. Moreover, as the reel 1702 is rotated to the point that the optical signal hits a portion of a clip (e.g., the bent portion 1712 and/or the engagement feature 1710 of FIGS. 17A-17D) wrapped around the reel 1702, light is reflected back at the optical detector 1945. The optical detector 1945 is preferably able to detect the reflection, thereby locating the bent portion and/or the engagement feature of the clip. This information assists in the process of threading the tape 1906 of the retrieved tape reel 1702 onto the tape drive 1904.

According to one approach which is in no way intended to limit the invention, the process for loading the tape onto the take-up reel 1910 once the reel 1702 is placed on the chuck 1914 preferably occurs in less than about 100 milliseconds, but could be slower. Upon loading the clip onto the take-up reel 1910, a winding process may initiate, e.g., to perform a preliminary locate operation, as described above. This rapid operation of the loading and/or unloading of a clip imposes additional forces on the clip that may be taken into account when designing the thickness, length, material composition. etc. of the clip, depending on the desired embodiment.

Moreover, in other approaches, the system may include a controller (e.g., see 1857 of FIG. 18), coupled to at least the optical detector 1945, that may assist in the preliminary locate operation.

Looking now to FIG. 19C, the chuck 1914, carriage 1916 and tape reel 1702 are moved along the guide 1918 to a final position, where the tape 1906 may be read from and/or written to.

In another embodiment, rather than moving the library reel 1702 and carriage 1916, the take-up reel 1910 and its motor may be moved to thread the tape drive 1904. In yet another embodiment, if the tape 1906 is stored on a pair of reels, the mobile robot may position the two reels directly on the tape drive 1904, where the tape 1906 may be located before threading.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may inchlude a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus for loading and unloading a tape storage medium, the apparatus comprising:
   a mechanized take-up reel having:
      an inner hub;
      an outer hub being selectively nonrotatably coupleable with the inner hub, wherein at least one of the hubs is coupled to a rotating mechanism;
      a tongue coupled to the inner hub;
      a slot in the outer hub for permitting the tongue to extend beyond a periphery of a tape engaging surface of the outer hub upon relative rotation between the inner and outer hubs; and
      a flange coupled with the outer hub,
      wherein the flange comprises a bearing for enabling rotation of the inner hub with respect to the outer hub.

2. The apparatus of claim 1, comprising a mechanism configured to engage the mechanized take-up reel for enabling and/or disabling the nonrotatable coupling.

3. The apparatus of claim 2, wherein the mechanism acts as a positioning device for preventing rotation of the outer hub when the inner hub rotates.

4. The apparatus of claim 2, comprising a pawl, wherein the mechanism is configured to engage the pawl for enabling and/or disabling the nonrotatable coupling.

5. The apparatus of claim 1, wherein the tongue comprises a distal end configured to detachably couple with a feature coupled to a tape storage medium.

6. The apparatus of claim 5, wherein the inner and outer hubs are configured to be nonrotatably coupled when in a predefined alignment relative to each other, wherein the apparatus is physically configured such that a distal edge of the feature resides in the slot of the outer hub when the inner and outer hubs are nonrotatably coupled.

7. An apparatus for loading and unloading a tape storage medium, the apparatus comprising:
   a mechanized take-up reel having:
      an inner hub;
      an outer hub being selectively nonrotatably coupleable with the inner hub, wherein at least one of the hubs is coupled to a rotating mechanism;
      a tongue coupled to the inner hub;
      a slot in the outer hub for permitting the tongue to extend beyond a periphery of a tape engaging surface of the outer hub upon relative rotation between the inner and outer hubs;
      a flange coupled with the outer hub; and
      a pawl,
      wherein the flange comprises a pivot that enables movement of the pawl to selectively nonrotatably couple the inner hub with the outer hub.

8. The apparatus of claim 7, wherein the tongue wraps around the inner hub and is completely retracted from the slot when in a retracted position.

9. The apparatus of claim 7, wherein the tongue comprises a distal end configured to detachably couple with a feature coupled to a tape storage medium.

10. The apparatus of claim 9, wherein the inner and outer hubs are configured to be nonrotatably coupled when in a predefined alignment relative to each other, wherein the apparatus is physically configured such that a distal edge of the feature resides in the slot of the outer hub when the inner and outer hubs are nonrotatably coupled.

11. The apparatus of claim 7, wherein the tongue is fabricated from a resiliently deformable material.

12. The apparatus of claim 7, wherein a distal end of the tongue has a generally flattened shape.

13. The apparatus of claim 7, wherein the outer hub is a hub/flange component.

14. The apparatus of claim 7, wherein the inner hub is coupled to the rotating mechanism.

15. The apparatus of claim 7, wherein the outer hub is coupled to the rotating mechanism.

16. The apparatus of claim 7, wherein the flange comprises a bearing for enabling rotation of the inner hub with respect to the outer hub.

17. The apparatus of claim 7, comprising a mechanism configured to engage the mechanized take-up reel for enabling and/or disabling the nonrotatable coupling.

18. The apparatus of claim 17, wherein the mechanism acts as a positioning device for preventing rotation of the outer hub when the inner hub rotates.

19. The apparatus of claim 17, comprising a pawl, wherein the mechanism is configured to engage the pawl for enabling and/or disabling the nonrotatable coupling.

20. An apparatus for loading and unloading a tape storage medium, the apparatus comprising:
   a mechanized take-up reel having:
      an inner hub;
      an outer hub being selectively nonrotatably coupleable with the inner hub, wherein at least one of the hubs is coupled to a rotating mechanism;
      a tongue coupled to the inner hub;
      a slot in the outer hub for permitting the tongue to extend beyond a periphery of a tape engaging surface of the outer hub upon relative rotation between the inner and outer hubs;
      a flange coupled with the outer hub; and
   a mechanism configured to engage the mechanized take-up reel for enabling and/or disabling the nonrotatable coupling.

21. The apparatus of claim 20, wherein the mechanism acts as a positioning device for preventing rotation of the outer hub when the inner hub rotates.

22. The apparatus of claim 20, comprising a pawl, wherein the mechanism is configured to engage the pawl for enabling and/or disabling the nonrotatable coupling.

23. The apparatus of claim 20, wherein the flange comprises a bearing for enabling rotation of the inner hub with respect to the outer hub.

24. The apparatus of claim 20, wherein the tongue comprises a distal end configured to detachably couple with a feature coupled to a tape storage medium.

25. The apparatus of claim 24, wherein the inner and outer hubs are configured to be nonrotatably coupled when in a predefined alignment relative to each other, wherein the apparatus is physically configured such that a distal edge of the feature resides in the slot of the outer hub when the inner and outer hubs are nonrotatably coupled.

* * * * *